United States Patent
Sauer et al.

(10) Patent No.: US 11,016,616 B2
(45) Date of Patent: May 25, 2021

(54) MULTI-DOMAIN TOUCH SENSING WITH TOUCH AND DISPLAY CIRCUITRY OPERABLE IN GUARDED POWER DOMAIN

(71) Applicant: Apple Inc., Cupertino, CA (US)

(72) Inventors: Christian M. Sauer, Cupertino, CA (US); Christoph H. Krah, Cupertino, CA (US); Steven P. Hotelling, Los Gatos, CA (US); Martin Paul Grunthaner, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/530,938

(22) Filed: Aug. 2, 2019

(65) Prior Publication Data
US 2020/0103992 A1  Apr. 2, 2020

Related U.S. Application Data

(60) Provisional application No. 62/738,836, filed on Sep. 28, 2018, provisional application No. 62/795,955, filed on Jan. 23, 2019.

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01)

(58) Field of Classification Search
CPC .... G06F 3/0412; G06F 3/0416; G06F 3/0418; G06F 3/04184; G06F 3/044
See application file for complete search history.

(56) References Cited

U.S. PATENT DOCUMENTS

| | | |
|---|---|---|
| 3,656,065 A | 4/1972 | Reinhard et al. |
| 3,984,757 A | 10/1976 | Gott et al. |
| 3,988,669 A | 10/1976 | Fasching |
| 4,149,231 A | 4/1979 | Bukosky et al. |

(Continued)

FOREIGN PATENT DOCUMENTS

| | | |
|---|---|---|
| CN | 102003612 A | 4/2011 |
| EP | 2131202 A1 | 12/2009 |

(Continued)

OTHER PUBLICATIONS

International Search Report received for PCT Patent Application No. PCT/US2017/044545, dated Oct. 27, 2017, 4 pages.

(Continued)

*Primary Examiner* — Chun-Nan Lin
(74) *Attorney, Agent, or Firm* — Kubota & Basol LLP

(57) ABSTRACT

An electronic device can include an integrated touch and display chip that can operate in multiple power domains. For example, the integrated touch and display chip can operate in a guarded power domain during the touch operation and can operate in a system power domain during non-guarded display operations. In some examples, two power domains can include a guarded power domain and a system power domain, whose grounds can be differentiated by a guard buffer signal. In some examples, the guard buffer can be disposed between the integrated touch and display chip and a battery of the device. In some examples, the guard buffer can be disposed between the battery of the device and the chassis of the device.

23 Claims, 16 Drawing Sheets

(56) References Cited

U.S. PATENT DOCUMENTS

| | | |
|---|---|---|
| 5,041,817 A | 8/1991 | Reeb |
| 5,095,224 A | 3/1992 | Renger |
| 5,173,685 A | 12/1992 | Nimmo |
| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,127,899 A | 10/2000 | Silva et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,373,474 B1 | 4/2002 | Katabami |
| 6,429,700 B1 | 8/2002 | Yang |
| 6,690,387 B2 | 2/2004 | Zimmerman et al. |
| 7,015,894 B2 | 3/2006 | Morohoshi |
| 7,151,417 B1 | 12/2006 | Suzuki |
| 7,184,064 B2 | 2/2007 | Zimmerman et al. |
| 7,211,966 B2 | 5/2007 | Green et al. |
| 7,288,945 B2 | 10/2007 | Martinez et al. |
| 7,525,348 B1 | 4/2009 | Ziazadeh |
| 7,589,596 B2 | 9/2009 | Masuda et al. |
| 7,663,607 B2 | 2/2010 | Hotelling et al. |
| 7,961,055 B2 | 6/2011 | Miyata et al. |
| 7,986,194 B2 | 7/2011 | Kiyohara et al. |
| 8,149,002 B2 | 4/2012 | Ossart et al. |
| 8,222,885 B2 | 7/2012 | Kirchmeier et al. |
| 8,436,687 B2 | 5/2013 | Aruga et al. |
| 8,479,122 B2 | 7/2013 | Hotelling et al. |
| 8,917,256 B2 | 12/2014 | Roziere |
| 8,933,710 B2 | 1/2015 | Blondin et al. |
| 8,963,372 B2 | 2/2015 | Takano et al. |
| 9,151,792 B1 | 10/2015 | Kremin et al. |
| 9,401,697 B2 | 7/2016 | Blondin et al. |
| 10,120,520 B2 | 11/2018 | Krah et al. |
| 10,459,587 B2 | 10/2019 | Krah et al. |
| 2004/0125918 A1 | 7/2004 | Shanmugavel et al. |
| 2005/0030683 A1 | 2/2005 | Tailliet |
| 2005/0146377 A1 | 7/2005 | Owen |
| 2005/0162408 A1 | 7/2005 | Martchovsky |
| 2006/0197753 A1 | 9/2006 | Hotelling |
| 2006/0202714 A1 | 9/2006 | Hoang et al. |
| 2006/0203403 A1 | 9/2006 | Schediwy et al. |
| 2008/0231292 A1 | 9/2008 | Ossart et al. |
| 2008/0246511 A1 | 10/2008 | Miura et al. |
| 2009/0027937 A1 | 1/2009 | Kirchmeier et al. |
| 2009/0294816 A1 | 12/2009 | Park et al. |
| 2010/0135051 A1 | 6/2010 | Mallwitz |
| 2010/0292945 A1 | 11/2010 | Reynolds et al. |
| 2011/0050256 A1 | 3/2011 | Frangen |
| 2011/0133788 A1 | 6/2011 | Liu et al. |
| 2011/0193848 A1 | 8/2011 | Kojima |
| 2011/0279409 A1 | 11/2011 | Salaverry et al. |
| 2012/0155086 A1 | 6/2012 | Shimonishi et al. |
| 2013/0021294 A1 | 1/2013 | Maharyta et al. |
| 2013/0285971 A1 | 10/2013 | Elias et al. |
| 2013/0323942 A1 | 12/2013 | Blondin et al. |
| 2014/0103712 A1 | 4/2014 | Blondin et al. |
| 2014/0125357 A1 | 5/2014 | Blondin et al. |
| 2014/0145732 A1 | 5/2014 | Blondin et al. |
| 2015/0035768 A1 | 2/2015 | Shahparnia et al. |
| 2015/0035787 A1 | 2/2015 | Shahpamia et al. |
| 2015/0035797 A1 | 2/2015 | Shahparnia |
| 2015/0091850 A1 | 4/2015 | Morein et al. |
| 2015/0091851 A1* | 4/2015 | Reynolds ............... G06F 3/0412 345/174 |
| 2015/0338958 A1 | 11/2015 | Decaro et al. |
| 2016/0034102 A1 | 2/2016 | Roziere et al. |
| 2016/0117017 A1 | 4/2016 | Kremin et al. |
| 2016/0177385 A1 | 6/2016 | Fife et al. |
| 2016/0195977 A1* | 7/2016 | Reynolds ............... G06F 3/0416 345/174 |
| 2017/0003779 A1* | 1/2017 | Reynolds ............... G06F 3/0412 |
| 2017/0068352 A1 | 3/2017 | Blondin et al. |
| 2017/0075495 A1 | 3/2017 | Roberson et al. |
| 2017/0090615 A1 | 3/2017 | Bohannon et al. |
| 2017/0108978 A1 | 4/2017 | Blondin et al. |
| 2017/0262121 A1 | 9/2017 | Kurasawa et al. |
| 2017/0285859 A1 | 10/2017 | Shepelev et al. |
| 2017/0315650 A1 | 11/2017 | Reynolds |
| 2018/0032176 A1 | 2/2018 | Krah et al. |
| 2018/0074633 A1 | 3/2018 | Kida et al. |
| 2018/0107309 A1 | 4/2018 | Endo et al. |
| 2019/0073061 A1 | 3/2019 | Krah et al. |
| 2019/0102004 A1 | 4/2019 | Krah |
| 2019/0102037 A1 | 4/2019 | Krah |
| 2020/0019265 A1 | 1/2020 | Krah et al. |

FOREIGN PATENT DOCUMENTS

| | | |
|---|---|---|
| FR | 2693555 A1 | 1/1994 |
| FR | 2756048 A1 | 5/1998 |
| FR | 2893711 A1 | 5/2007 |
| JP | 9-280806 | 10/1997 |
| JP | 11-304942 A | 11/1999 |
| JP | 2000-132319 A | 5/2000 |
| JP | 2000-163031 A | 6/2000 |
| JP | 2002-342033 A | 11/2002 |
| JP | 2011-53212 A | 3/2011 |
| KR | 10-2007-0042178 A | 4/2007 |
| KR | 10-2014-0043395 A | 4/2014 |
| WO | 2007/058727 A1 | 5/2007 |
| WO | 2007/060324 A1 | 5/2007 |
| WO | 2012/172240 A1 | 12/2012 |
| WO | 2012/172241 A1 | 12/2012 |
| WO | 2015/017196 A1 | 2/2015 |
| WO | 2018/023089 A1 | 2/2018 |
| WO | 2019/067267 A1 | 4/2019 |
| WO | 2019/067268 A1 | 4/2019 |

OTHER PUBLICATIONS

International Search Report received for PCT Patent Application No. PCT/US2018/051587, dated Jan. 7, 2019, 3 pages.

International Search Report received for PCT Patent Application No. PCT/US2018/051588, dated Jan. 11, 2019, 3 pages.

Non-Final Office Action received for U.S. Appl. No. 16/134,651, dated Nov. 29, 2019, 10 pages.

Non-Final Office Action received for U.S. Appl. No. 16/179,565, dated Dec. 13, 2018, 9 pages.

Non-Final Office Action received for U.S. Appl. No. 16/581,721, dated Oct. 30, 2019, 10 pages.

Non-Final Office Action received for U.S. Appl. No. 16/134,604, dated Dec. 26, 2019, 16 pages.

Notice of Allowance received for U.S. Appl. No. 15/663,271, dated Jul. 5, 2018, 10 pages.

Notice of Allowance received for U.S. Appl. No. 16/179,565, dated Jun. 6, 2019, 7 pages.

Notice of Allowance received for U.S. Appl. No. 16/581,721, dated Apr. 22, 2020, 5 pages.

Lee et al., "A Multi-Touch Three Dimensional Touch-Sensitive Tablet", CHI'85 Proceedings, Apr. 1985, pp. 21-25.

Rubine, Dean, "Combining Gestures and Direct Manipulation", CHI'92, May 3-7, 1992, pp. 659-660.

Rubine, Deanh. , "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.

Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

Final Office Action received for U.S. Appl. No. 16/134,604, dated Jul. 8, 2020, 18 pages.

Final Office Action received for U.S. Appl. No. 16/134,651, dated Aug. 7, 2020, 13 pages.

(56) References Cited

OTHER PUBLICATIONS

Notice of Allowance received for U.S. Appl. No. 16/581,721, dated Aug. 4, 2020, 5 pages.

* cited by examiner

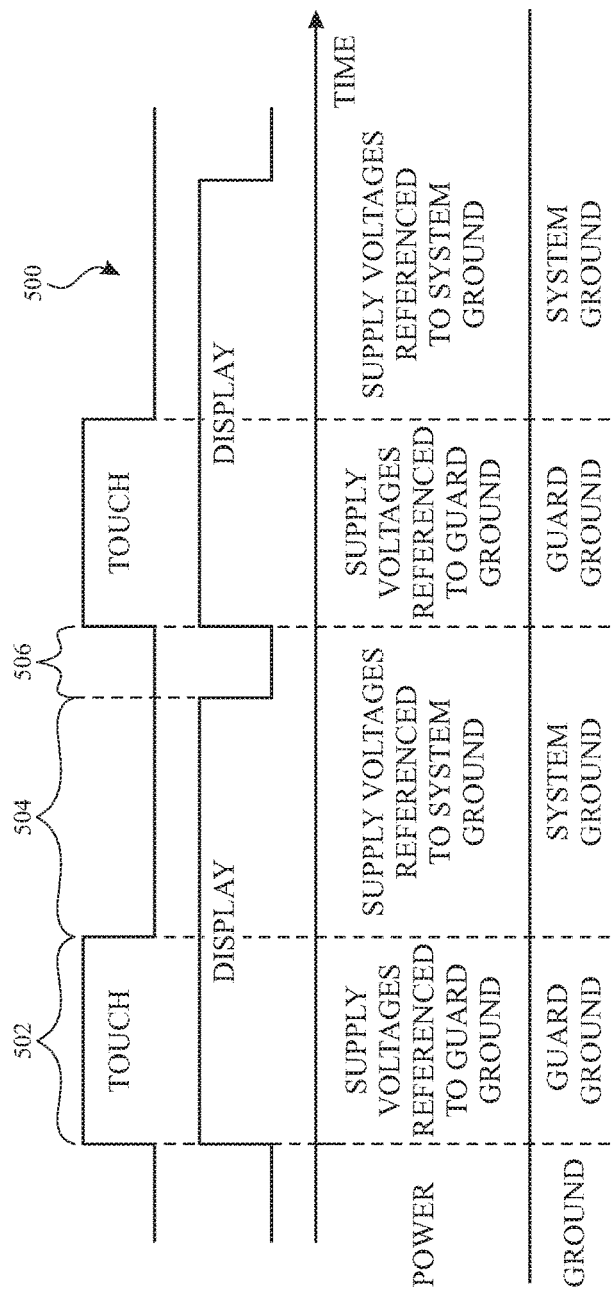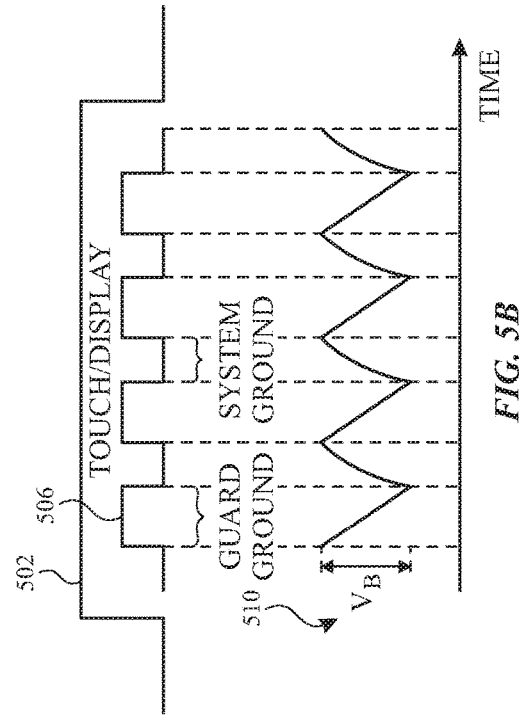

MULTI-DOMAIN TOUCH SENSING WITH TOUCH AND DISPLAY CIRCUITRY OPERABLE IN GUARDED POWER DOMAIN

CROSS-REFERENCE TO RELATED APPLICATION

This application claims the benefit under 35 USC 119(e) of U.S. Provisional Patent Application No. 62/738,836, filed Sep. 28, 2018, and U.S. Provisional Patent Application No. 62/795,955, filed Jan. 23, 2019, the contents of which are incorporated herein by reference in their entirety for all purposes.

FIELD OF THE DISCLOSURE

This relates generally to a touch screen devices, and more particularly to touch-sensitive devices operating in multiple power domains.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electric fields used to detect touch can extend beyond the surface of the display, and objects approaching near the surface may be detected near the surface without actually touching the surface.

Capacitive touch sensor panels can be formed by a matrix of transparent, semi-transparent or non-transparent conductive plates made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

In some cases, parasitic or stray capacitances can exist between the touch node electrodes used for sensing touch on the touch sensor panels, and other components of the devices in which the touch sensor panels are included, which can be referenced to a chassis ground (also referred to herein as device ground). These parasitic or stray capacitances can introduce errors and/or offsets into the touch outputs of the touch sensor panels. Therefore, it can be beneficial to reduce or eliminate such parasitic or stray capacitances.

SUMMARY OF THE DISCLOSURE

This relates generally to touch-sensitive devices operating in multiple power domains. In some examples, to reduce or eliminate stray or parasitic capacitances that can exist between the touch electrodes and chassis ground, the touch and display circuitry can be operated in a different power domain than other circuitry in the system. In some examples, two power domains can include a guarded power domain and a system power domain, whose grounds can be differentiated by a guard buffer.

In some examples, touch and display operation can be time-multiplexed. An integrated touch and display chip, for example, can operate in a guarded power domain during the touch operation and can operate in a system power domain during display operations. During the touch operation, the display pixels states can be maintained with reference to the guarded power domain and during the display operation, the display pixels can be refreshed with reference to the system power domain. In some examples, touch and display operation can be partially or fully concurrent. The display pixels can be refreshed and/or display pixels states can be maintained with reference to the guarded power domain during the concurrent touch and display operation and can the display pixels can be refreshed and/or display pixels states maintained with reference to the system power domain during display operations that are not concurrent with touch operations.

In some examples, display and touch data communications between an integrated touch and display chip operating in a guarded power domain and another chip (e.g., host processor) operating in a system power domain can be suspended during guarded operation (e.g., by decoupling the communication link. In some examples, the display and touch data communications between an integrated touch and display chip and another chip can operate during guarded or non-guarded operation using level shifters. In some examples, the level shifter can be bypassed during non-guarded operation to reduce power and increase speed of the data transfer. In some examples, a guard and power management chip can interface between the integrated touch and display chip (operable in a guarded power domain or a system power domain) and another chip (operable in the system power domain).

In some examples, to reduce or eliminate stray or parasitic capacitances that can exist between the touch electrodes and chassis ground, the touch and display circuitry (and other circuitry including the system battery) can be operated in a different power domain than the chassis. In some examples, the chassis ground and the battery ground (and touch and display circuitry reference to the battery ground) can be differentiated by a guard buffer. In some examples, the output of the guard buffer can be measured to estimate a chassis impedance to earth ground. The estimated chassis impedance can be used to predict an object is contacting the chassis and/or can be used to compensate touch signals generated in response to an object detected in contact or proximity with the touch sensor panel.

BRIEF DESCRIPTION OF THE DRAWINGS

FIG. 5A illustrates an exemplary timeline for partially concurrent touch and display operations and corresponding power domains for a device according to examples of the disclosure.

FIG. 5B illustrates an exemplary stimulation waveform and a corresponding exemplary voltage waveform for a supply capacitor according to examples of the disclosure.

DETAILED DESCRIPTION

Figure 1A:
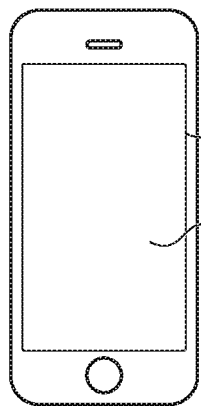
FIGS. 1A-1E illustrate exemplary systems including a touch screen and touch and display circuitry operable in multiple power domains according to examples of the disclosure

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch-sensitive devices operating in multiple power domains. In some examples, to reduce or eliminate stray or parasitic capacitances that can exist between the touch electrodes and chassis ground, the touch and display circuitry can be operated in a different power domain than other circuitry in the system. In some examples, two power domains can include a guarded power domain and a system power domain, whose grounds can be differentiated by a guard buffer.

In some examples, touch and display operation can be time-multiplexed. An integrated touch and display chip, for example, can operate in a guarded power domain during the touch operation and can operate in a system power domain during display operations. During the touch operation, the display pixels states can be maintained with reference to the guarded power domain and during the display operation, the display pixels can be refreshed with reference to the system power domain. In some examples, touch and display operation can be partially or fully concurrent. The display pixels can be refreshed and/or display pixels states can be maintained with reference to the guarded power domain during the concurrent touch and display operation and can the display pixels can be refreshed and/or display pixels states maintained with reference to the system power domain during display operations that are not concurrent with touch operations.

In some examples, display and touch data communications between an integrated touch and display chip operating in a guarded power domain and another chip (e.g., host processor) operating in a system power domain can be suspended during guarded operation (e.g., by decoupling the communication link. In some examples, the display and touch data communications between an integrated touch and display chip and another chip can operate during guarded or non-guarded operation using level shifters. In some examples, the level shifter can be bypassed during non-guarded operation to reduce power and increase speed of the data transfer. In some examples, a guard and power management chip can interface between the integrated touch and display chip (operable in a guarded power domain or a system power domain) and another chip (operable in the system power domain).

In some examples, to reduce or eliminate stray or parasitic capacitances that can exist between the touch electrodes and chassis ground, the touch and display circuitry (and other circuitry including the system battery) can be operated in a different power domain than the chassis. In some examples, the chassis ground and the battery ground (and touch and display circuitry reference to the battery ground) can be differentiated by a guard buffer. In some examples, the output of the guard buffer can be measured to estimate a chassis impedance to earth ground. The estimated chassis impedance can be used to predict an object is contacting the chassis and/or can be used to compensate touch signals generated in response to an object detected in contact or proximity with the touch sensor panel.

Figure 1B:
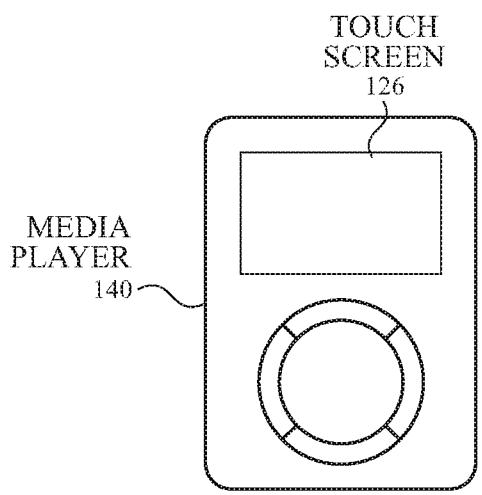
Figure 1C:
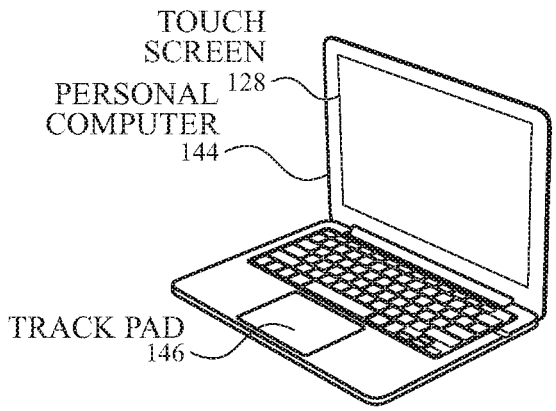
Figure 1D:
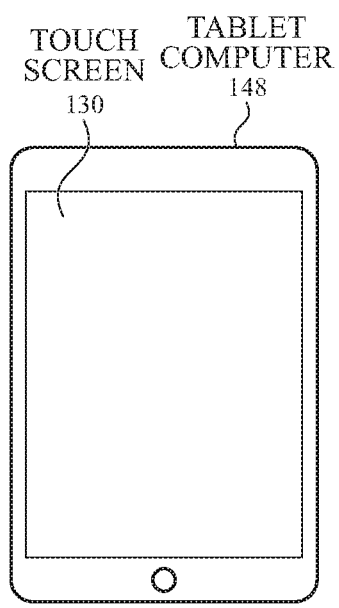
Figure 1E:
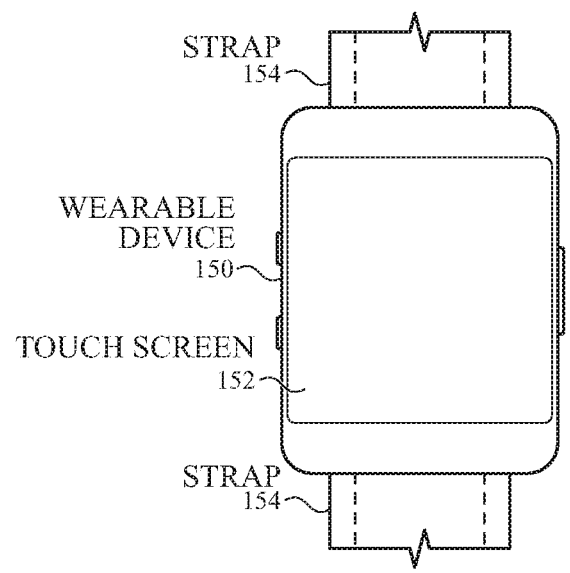

FIGS. 1A-1E illustrate exemplary systems, including a touch screen, operable in multiple power domains according to examples of the disclosure FIG. 1A illustrates an exemplary mobile telephone 136, that includes a touch screen 124, operable in multiple power domains. FIG. 1B illustrates an exemplary digital media player 140, that includes a touch screen 126, operable in multiple power domains. FIG. 1C illustrates an exemplary personal computer 144, that includes a trackpad 146 and a touch screen 128, and operable in multiple power domains. FIG. 1D illustrates an exemplary tablet computer 148, that includes a touch screen 130, operable in multiple power domains. FIG. 1E illustrates an example wearable device 150 (e.g., a watch), that includes a touch screen 152, operable in multiple power domains. It is understood that the above touch screens can be implemented in other devices operable in multiple power domains as well. Additionally it should be understood that although the disclosure herein primarily focuses on touch screens, the disclosure can be implemented for devices including touch sensor panels and displays that may not be implemented as a touch screen.

In some examples, touch screens 124, 126, 128, 130 and 152 can be can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 2E). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers, or may be adjacent to each other on the same layer (e.g., as described below with reference to FIG. 2D). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128 and 130 can be based on mutual capacitance and/or self-capacitance. The electrodes can be arrange as a matrix of small, individual plates of conductive material (e.g., as in touch node electrodes 272 in touch screen 270 in FIG. 2E) or as drive lines and sense lines (e.g., as in row touch electrodes 264 and column touch electrodes 262 in touch screen 260 in FIG. 2D), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2A:
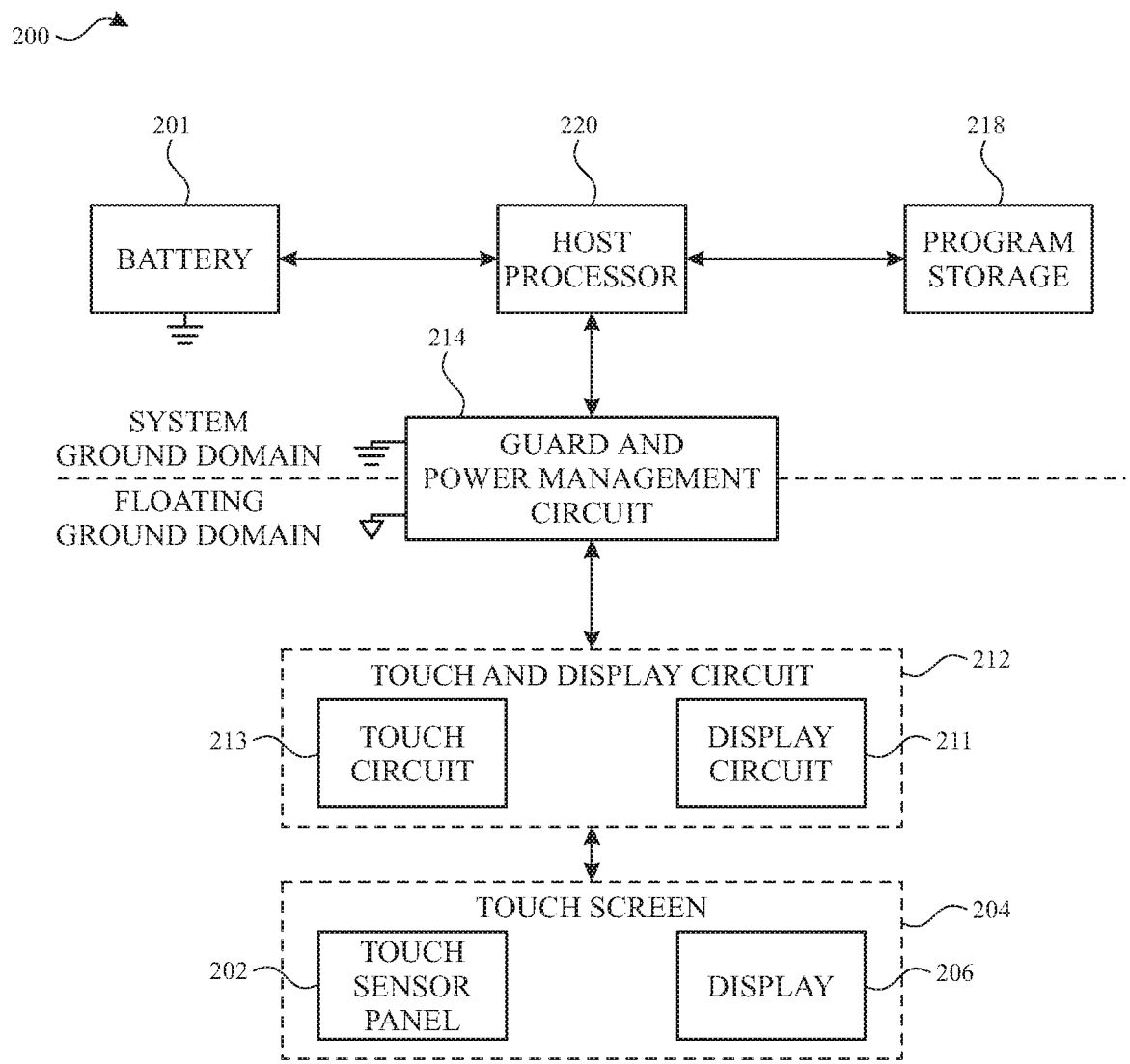
FIG. 2A is a block diagram of an exemplary computing system that illustrates one implementation of an exemplary touch screen and exemplary touch and display integrated circuit operable in multiple power domains according to examples of the disclosure.

FIG. 2A is a block diagram of an exemplary computing system 200 that illustrates one implementation of an exemplary touch screen 204 and exemplary touch and display integrated circuit 212 operable in multiple power domains according to examples of the disclosure. Computing system 200 can be included in, for example, mobile telephone 136, digital media player 140, personal computer 144, tablet computer 148, wearable device 150 or any mobile or non-mobile computing device that includes a touch screen. Computing system 200 can include a power supply (e.g., battery 201), host processor 220, and program storage 218. Battery 201 can provide power for computing system 200 and the negative terminal of battery 201 can define the system ground. Although not shown in FIG. 2A, the negative terminal of battery 201 can be coupled to a chassis of the device such that the system ground can also be referred to as the chassis ground. Host processor 220 and program storage 218 can operate in the system power domain referenced to system ground (also referred to herein as "system domain", "system power domain" or "system ground domain"). Computing system 200 can also include a touch and display sub-system which can operate in a system power domain referenced to system ground or in a guarded power domain referenced to a guard ground (also referenced to herein as "guarded domain", "guarded (or floating) power domain" or "guarded (or floating) ground domain"). The touch and display sub-system can include touch screen 204, which can be an integrated touch screen or can include a touch sensor panel 202 and a display 206, and one or more integrated circuits for operation of touch screen 204. In some examples, touch screen 204 can include a touch electrodes (e.g., as illustrated in FIGS. 2D-2E) and a display device such as a liquid crystal display (LCD), light emitting diode (LED) display or organic light emitting diode (OLED) display. In some examples, touch screen 204 can be formed on a single substrate with micro-LEDs, display chiplets (e.g., including circuitry to drive the micro-LEDs) and touch chiplets (e.g., including circuitry to drive and/or sense touch electrodes).

The touch and display sub-system can include an integrated touch and display integrated circuit 212 to operate touch screen 204. Touch and display integrated circuit 212 can operate in a system domain or in a guarded domain as described herein. Computing system 200 can also include a guard and power management integrated circuit 214. As described in more detail herein, self-capacitance touch sensing performance can be improved (and parasitic capacitance effects reduced) by performing touch sensing operations in a guarded domain rather than in the system power domain. In some examples, guard and power management integrated circuit 214 can be used to operate touch screen 204 in a guarded power domain during guarded touch operations and operate touch screen 204 in the system power domain otherwise (e.g., during non-guarded touch operations or during display operations). Guard and power management integrated circuit 214 can generate a guard voltage and can provide the voltages necessary for touch and display integrated circuit 212, including guard-referenced or system-referenced power supplies when operating in a guarded power domain or system power domain, respectively. Touch and display integrated circuit 212 can include circuitry to perform touch sensing operations (e.g., guarded self-capacitance scan, non-guarded self or mutual capacitance scans) and display operations (e.g., refreshing display pixels). Although illustrated in FIG. 2A as a touch and display integrated circuit 212 and a guard and power management integrated circuit 214, the various components and/or functionality of the touch and display integrated circuit 212 or guard and power management integrated circuit 214 can be implemented with multiple circuits, elements, chips, and/or discrete components (e.g., a separate guard integrated circuit, separate power management circuit, a separate touch integrated circuit and a separate display integrated circuit).

Touch and display integrated circuit 212 can include display circuitry 211 to perform display operations. Display circuitry 211 can include hardware to process one or more still images and/or one or more video sequences for display on touch screen 204. The display circuitry 211 can be configured to generate read memory operations to read the data representing the frame/video sequence from a memory (not shown) through a memory controller (not shown), for example, or can receive the data representing the frame/video sequence from host processor 220. The display circuitry 211 can be configured to perform various processing on the image data (e.g., still images, video sequences, etc.). In some examples, the display circuitry 211 can be configured to scale still images and to dither, scale and/or perform color space conversion on the frames of a video sequence. Display circuitry 211 can be configured to blend the still image frames and the video sequence frames to produce output frames for display. The display circuitry 211 can also be more generally referred to as a display controller, display pipe, display control unit, or display pipeline. The display control unit can be generally any hardware and/or firmware configured to prepare a frame for display from one or more sources (e.g., still images and/or video sequences). More particularly, the display circuitry 211 can be configured to retrieve source frames from one or more source buffers stored in memory, composite frames from the source buffers, and display the resulting frames on integrated touch screen 204. Accordingly, the display circuitry 211 can be configured to read one or more source buffers and composite the image data to generate the output frame. Display circuitry 211 can provide various control and data signals to the display, including timing signals (e.g., one or more clock signals) and pixel selection signals. The timing signals can include a pixel clock that can indicate transmission of a pixel. The data signals can include color signals (e.g., red, green, blue) for LEDs. The display circuitry can control touch screen 204 in real-time, providing the data indicating the pixels to be displayed as the touch screen is displaying the image indicated by the frame. The interface to such a touch screen 204 can be, for example, a video graphics array (VGA) interface, a high definition multimedia interface (HDMI), a mobile industry processor interface (MIPI), a digital video interface (DVI), a LCD/LED/OLED interface, a plasma interface, or any other suitable interface.

Touch and display integrated circuit 212 can include touch circuitry 213 to perform touch operations. Touch circuitry 213 can include one or more touch processors, peripherals (e.g., random access memory (RAM) or other types of memory or storage, watchdog timers and the like), and a touch controller. The touch controller can include, but is not limited to, driver logic, one or more sense channels (e.g., including sense circuitry such as a sense amplifier 250, demodulation mixer, analog-to-digital converter (ADC), anti-aliasing filter (AAF), etc.) and channel scan logic (e.g., implemented in programmable logic circuits or as discrete logic circuits) which can provide configuration and control for the driver logic and sense channels. For example, driver logic and sense channels can be configured to drive, sense and/or ground touch node electrodes depending on the mode of touch sensing operations. The mode of touch sensing operations can, in some examples, be determined by a scan plan stored in memory (e.g., RAM) in touch circuitry 213. The scan plan can provide a sequence of scan events to perform during a frame. The scan plan can also include information necessary for providing control signals to and programming driver logic and/or sense channels for the specific scan event to be performed, and for analyzing data from the sense channels according to the specific scan event to be performed. The scan events can include, but are not limited to, a mutual capacitance scan, a self-capacitance scan, a stylus scan, touch spectral analysis scan, and stylus spectral analysis scan. The channel scan logic or other circuitry in touch circuitry 213 can provide the stimulation signals at various frequencies and phases that can be selectively applied to the touch node electrodes of touch screen 204 or used for demodulation of signals sensed by the sense channels (touch data). The touch circuitry 213 can also store touch data in memory (e.g., RAM) and/or process touch data (e.g., by one or more touch processors or touch controller) to determine locations of touch and/or clean operating frequencies for touch sensing operations (e.g., spectral analysis).

Touch screen 204 can be used to derive touch data at multiple discrete locations of the touch screen, referred to herein as touch nodes. For example, touch screen 204 can include touch sensing circuitry that can include a capacitive sensing medium having a plurality of electrically isolated touch node electrodes. Touch node electrodes can be coupled to touch and display integrated circuit 212 for touch sensing. As used herein, an electrical component "coupled to" or "connected to" another electrical component encompasses a direct or indirect connection providing electrical path for communication or operation between the coupled components. Thus, for example, touch node electrodes of integrated touch screen 204 may be directly connected to sense amplifiers in touch and display integrated circuit 212 or indirectly connected to sense amplifiers in touch and display integrated circuit 212 via switching circuitry (not shown), but in either case provided an electrical path for driving and/or sensing the touch node electrodes. Labeling the conductive plates (or groups of conductive plates) used to detect touch as touch node electrodes corresponding to touch nodes (discrete locations of the touch screen) can be particularly useful when touch screen 204 is viewed as capturing an "image" of touch (or "touch image"). The touch image can be a two-dimensional representation of values indicating an amount of touch detected at each touch node electrode corresponding to a touch node in integrated touch screen 204. The pattern of touch nodes at which a touch occurred can be thought of as a touch image (e.g., a pattern of fingers touching the touch screen). In such examples, each touch node electrode in a pixelated touch screen can be sensed for the corresponding touch node represented in the touch image.

Host processor 220 can be connected to program storage 218 to execute instructions stored in program storage 218 (e.g., a non-transitory computer-readable storage medium). Host processor 220 can, for example, provide control and data signals so that touch and display integrated circuit 212 can generate a display image on integrated touch screen 204, such as a display image of a user interface (UI). Host processor 220 can also receive outputs from touch and display integrated circuit 212 (e.g., touch inputs from the one or more touch processors) and perform actions based on the outputs. The touch input can be used by computer programs stored in program storage 218 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 220 can also provide control signals so that guard and power management integrated circuit 214 can operate touch and display integrated circuit 212 in the proper power domain and provide for communications between touch and display integrated circuit 212 and host processor 220. Host processor 220 can also perform additional functions that may not be related to touch processing and display.

Note that one or more of the functions described herein can be performed by firmware stored in memory (e.g., one of the peripherals in touch and display integrated circuit 212) and executed by one or more processors (in touch and display integrated circuit 212), or stored in program storage 218 and executed by host processor 220. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, universal serial bus (USB) memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

It is to be understood that the computing system 200 is not limited to the components and configuration of FIG. 2A, but can include other or additional components in multiple configurations according to various examples. Additionally, the components of computing system 200 can be included within a single device, or can be distributed between multiple devices.

As described herein, in some examples, touch and display integrated circuit 212 can perform touch sensing operations (e.g., self-capacitance scans) in a guarded power domain rather than in the system power domain. In some examples, touch and display integrated circuit 212 can perform non-guarded touch sensing operations (e.g., mutual capacitance scans) or display operations in the system power domain. In some examples, touch and display integrated circuit 212 can perform display operations (e.g., refresh and/or maintaining state) in the guarded power domain and/or in the system power domain.

Figure 2B:
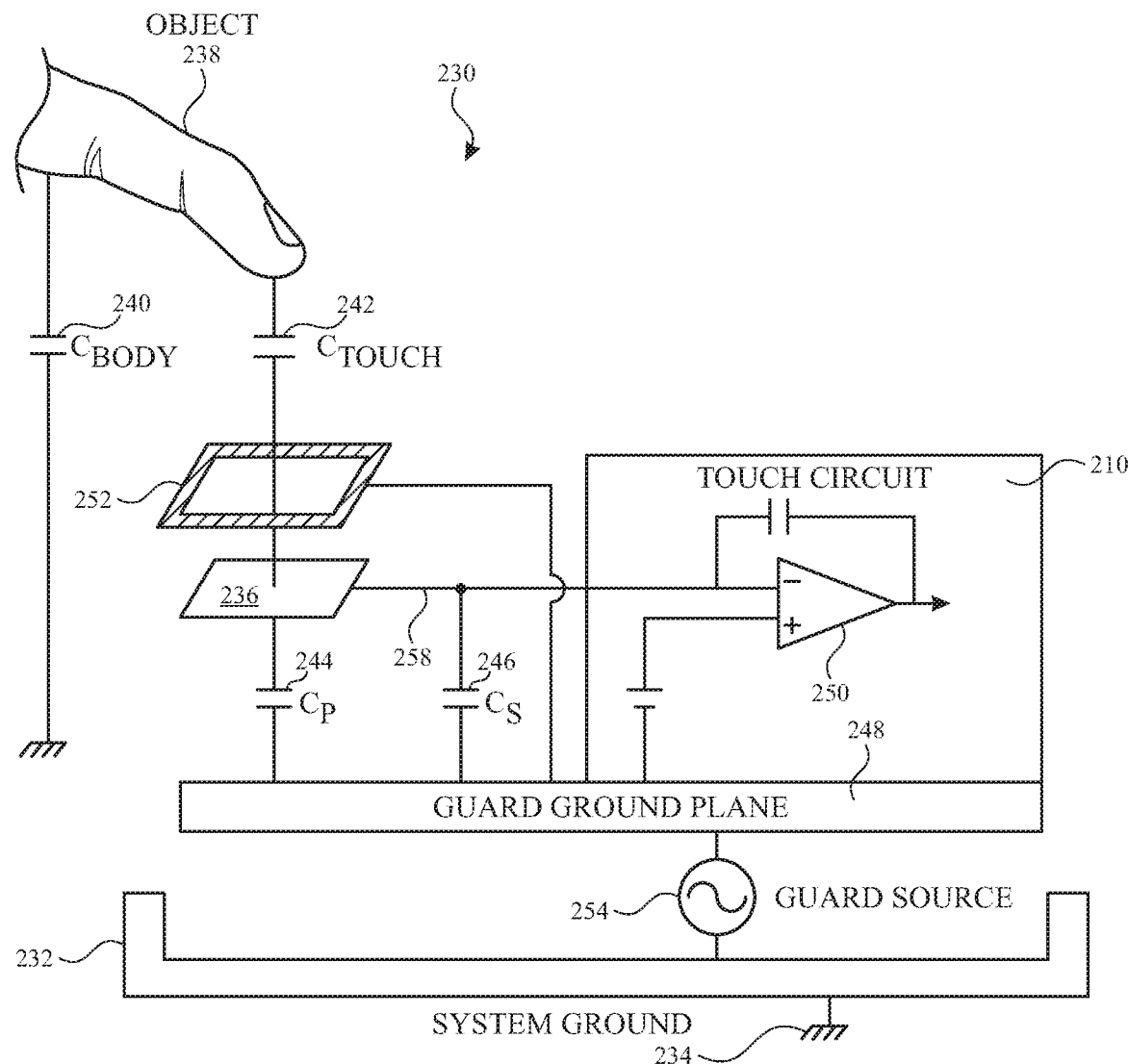
FIG. 2B illustrates an exemplary touch sensing configuration including various associated capacitances according to examples of the disclosure.

FIG. 2B illustrates an exemplary touch sensing configuration 230 including various associated capacitances according to examples of the disclosure. In configuration 230 of FIG. 2B, the touch sensing circuitry of touch screen 204 can be referenced to a guard ground rather than a system ground. Specifically, in configuration 230 of FIG. 2B, touch sensing circuitry (e.g., sense amplifier 250) in touch circuit 213 can be coupled to a touch node electrode 236 by a routing trace 258. Touch circuit 213 can be implemented in touch and display integrated circuit 212 disposed or fabricated on a substrate including a ground plane 248. During guarded operation, ground plane 248 (also referred to as "guard plane" or "guard ground plane") can be driven with a guard voltage such that it represents a guard ground. In guarded operation, guard ground plane 248 can represent a virtual ground plane of touch circuit 213 (and of touch and display integrated circuit 212) that is different from system ground 234 (also referred to herein as chassis ground, or device ground). In particular, stimulation source 254 ("guard source"), e.g., generated in guard and power management integrated circuit 214, can be referenced to system ground 234, and can output a guard voltage (e.g., a guard stimulation signal, such as a square or trapezoid wave) that can establish the voltage at guard plane 248. In this manner, the guard plane 248 acting as a guard ground for touch circuit 213 during guarded touch operations can be referenced to the guard voltage. Because touch circuit 213 can be mounted on a substrate including guard plane 248, the sense amplifier in touch circuit 213 can be referenced to the guard signal (and receive other guard-referenced voltages produced by guard and power management integrated circuit 214, for example), and can be isolated from system ground 234 by guard plane 248. In this way, touch circuit 213 can operate in the guard power domain, whereas the guard source 254 (e.g., in guard and power management integrated circuit 214) can operate in the system power domain. Guard plane 248 can be any conductive material of a substrate on which touch and display integrated circuit 212 can be disposed or fabricated (e.g., silver, copper, gold, etc.). For example, touch and display integrated circuit 212 may be assembled on a printed circuit board (PCB), and may be referenced to the PCB ground layer 248 driven, during guarded self-capacitance scans, by guard source 254. Guard source 254 can be implemented, for example, using a waveform generator (e.g., generating arbitrary waveforms, such as a square wave, referenced to system ground 234) whose output can be inputted in to a digital-to-analog converter (DAC). Analog output from the DAC can be provided to a linear buffer (e.g., with unity or some other gain) whose output can correspond to the output of guard source 254.

Additionally, guard plane 248 can be disposed between touch node electrode 236 and chassis 232 (or, more generally, chassis/system ground 234), and guard plane 248 can be disposed between a routing trace that couples touch node electrode 236 to touch circuit 213 and chassis 232 (or, more generally, chassis/system ground 234). Thus, guard plane 248 can similarly isolate touch node electrode 236 and routing trace 258 that couples touch node electrode 236 to touch circuit 210 from system ground 234. Guard plane 248 can reduce or eliminate parasitic or stray capacitances that may exist between touch node electrode 236 and system ground 234, as will be described below. Optionally, a guard plane can be included in a layer above the touch node electrodes and/or between touch node electrodes (e.g., as illustrated by guard plane 252) and can be referenced to the same guard voltage. Guard plane 252 can include openings corresponding to touch node electrodes to enable detection of touch activity on the touch sensor panel (or proximity activity) while guarding the touch node electrodes and routing from stray capacitances that can form due to a touch or other stray capacitances. In some examples, the material(s) out of which guard planes 248 and 252 are made can be different. For example, guard plane 252 above the touch node electrodes can be made of ITO, or another fully or partially transparent conductor), and guard planes 248 in the substrate (e.g., PCB) can be made of a different conductor, such as copper, aluminum, or other conductor that may or may not be transparent.

Various capacitances associated with touch and/or proximity detection using configuration 230 are also shown in FIG. 2B. Specifically, an object 238 (e.g., a finger) can be in touching or in proximity to touch node electrode 236. Object 238 can be grounded to earth ground (and the system ground 234 via the user holding the device chassis) through capacitance 240 (e.g., $C_{body}$), which can represent a capacitance from object 238 through a user's body to earth/system ground 234. Capacitance 242 (e.g., $C_{touch}$) can represent a capacitance between object 238 and touch node electrode 236, and can be the capacitance of interest in determining how close object 238 is to touch node electrode 236. Typically, $C_{body}$ 240 can be significantly larger than $C_{touch}$ 242 such that the equivalent series capacitance seen at touch node electrode 236 through object 238 can be approximately $C_{touch}$ 242. Capacitance 242 can be measured by touch sensing circuitry (e.g., sense amplifier 250) included in touch circuit 213 to determine an amount of touch at touch node electrode 236 based on the sensed touch signal. As shown in FIG. 2B, touch sensing circuitry in touch circuit 213 can be referenced to guard ground (e.g., with some DC biasing and supply voltages provided by the touch circuit 213 and/or guard and power management integrated circuit 214). In some examples, capacitance 244 (e.g., $C_p$) can be a parasitic capacitance between touch node electrode 236 and guard plane 248. Capacitance 246 (e.g., $C_s$) can be a stray capacitance between routing trace 258 coupled to touch node electrode 236 and guard plane 248, for example. In some examples, the impact of capacitances 244 and 246 on a sensed touch signal can be mitigated because guard plane 248 and touch sensing circuitry in touch circuit 213 are all referenced to the virtual ground signal produced by guard source 254 during a guarded self-capacitance scan.

When guarded, the voltage at touch node electrode 236 and trace 258 can mirror or follow the voltage at guard plane 248, and thereby capacitances 244 and 246 can be reduced or eliminated from the touch measurements performed by touch circuit 213. Without stray capacitances 244 and 246 affecting the touch measurements, the offset in the output signal of sense amplifier 250 (e.g., when no touch is detected at touch node electrode 236) can be greatly reduced or eliminated, which can increase the signal to noise ratio and/or the dynamic range of sense circuitry in touch circuit 213. This, in turn, can improve the ability of touch sensing circuitry in touch circuit 213 to detect a greater range of touch at touch node electrode 236, and to accurately detect smaller capacitances $C_{touch}$ 242 (and, thus, to accurately detect proximity activity at touch node electrode 236 at larger distances). Additionally, with a near-zero offset output signal from touch sensing circuitry in touch circuit 213, the effects of drift due to environmental changes (e.g., temperature changes) can be greatly reduced. For example, if the signal out of sense amplifier 250 consumes 50% of its dynamic range due to undesirable/un-guarded stray capacitances in the system, and the analog front end (AFE) gain changes by 10% due to temperature, the sense amplifier 250 output may drift by 5% and the effective signal-to-noise ratio (SNR) can be limited to 26 dB. By reducing the undesirable/un-guarded stray capacitances by 20 dB, the effective SNR can be improved from 26 dB to 46 dB.

Figure 2C:
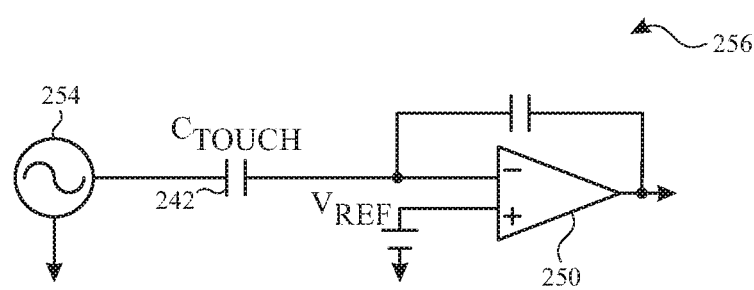
FIG. 2C illustrates an exemplary equivalent circuit diagram of an exemplary touch sensing configuration according to examples of the disclosure.
Figure 2D:
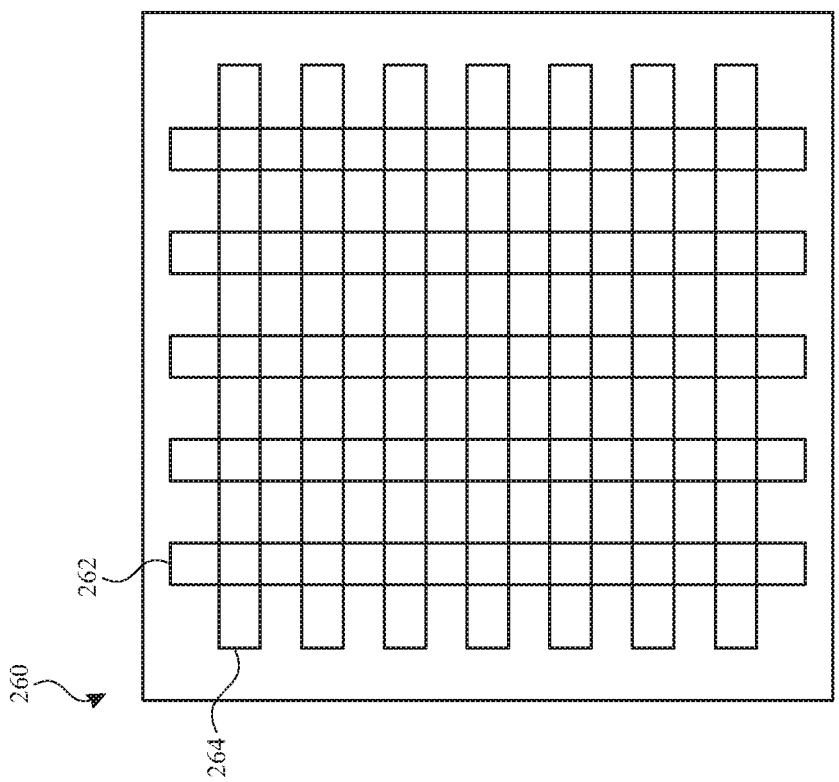
FIG. 2D illustrates touch screen with touch electrodes and arranged in rows and columns according to examples of the disclosure.
Figure 2E:
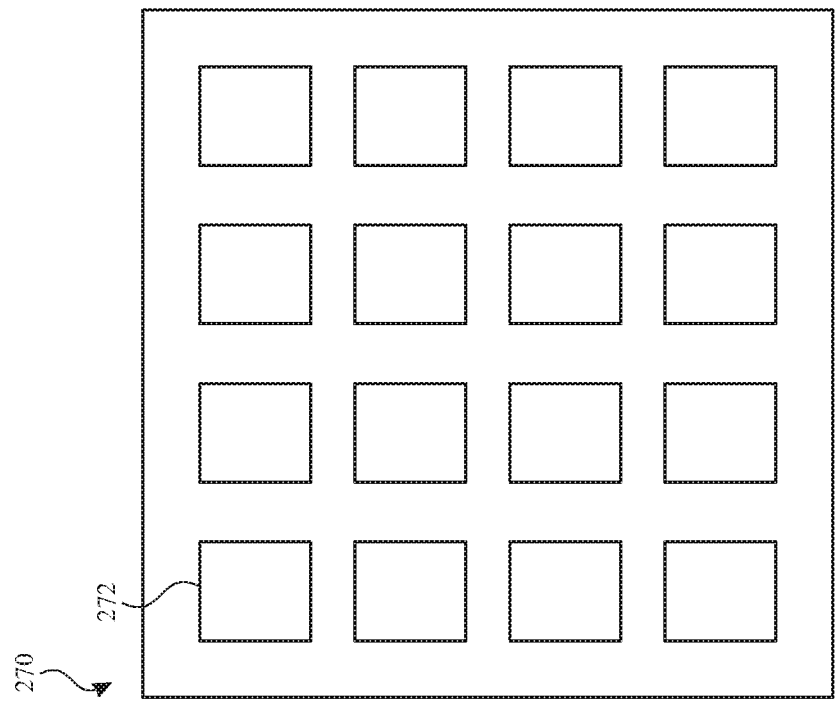
FIG. 2E illustrates touch screen with touch node electrodes arranged in a pixelated touch node electrode configuration according to examples of the disclosure.

FIG. 2C illustrates an exemplary equivalent circuit diagram of an exemplary touch sensing configuration 256 according to examples of the disclosure. As described herein, guarding can reduce or eliminate capacitances 244 and 246 from the touch measurements performed by touch sensing circuitry in touch circuit 213. As a result, the sense amplifier 250 can simply detect $C_{touch}$ 242, which can appear as a virtual mutual capacitance between object 238 and touch node electrode 236. Specifically, object 238 can appear to be stimulated (e.g., via $C_{body}$ 240) by guard source 254, and object 238 can have $C_{touch}$ 242 between it and the inverting input of sense amplifier 250. Changes in $C_{touch}$ 242 can, therefore, be sensed by sense amplifier 250 as changes in the virtual mutual capacitance $C_{touch}$ 242 between object 238 and sense amplifier 250. As such, the offset in the output signal of sense amplifier 250 (e.g., when no touch is detected at touch node electrode 236) can be greatly reduced or eliminated, as described above. As a result, sense amplifier 250 (e.g., the input stage of touch circuit 213) need not support as great a dynamic input range that self-capacitance sense circuitry might otherwise need to support in circumstances/configurations that do not exhibit the virtual mutual capacitance effect described here.

Because the self-capacitance measurements of touch node electrodes in self-capacitance based touch screen configurations can exhibit the virtual mutual capacitance characteristics described above, touch circuit 213 can be designed with a simpler architecture to support both self-capacitance measurements and mutual capacitance measurements.

Referring back to FIG. 2A, integrated touch screen 204 can be integrated such that touch sensing circuit elements of the touch sensing system can be integrated with the display stack-up and some circuit elements can be shared between touch and display operations. It is noted that circuit elements are not limited to whole circuit components, such as a whole capacitor, a whole transistor, etc., but can include portions of circuitry, such as a conductive plate.

FIG. 2D illustrates touch screen 260 with touch electrodes 262 and 264 arranged in rows and columns according to examples of the disclosure. Specifically, touch screen 260 can include a plurality of touch electrodes 264 disposed as rows, and a plurality of touch electrodes 262 disposed as columns. Touch electrodes 264 and touch electrodes 262 can be on the same or different material layers of touch screen 260, and can intersect with each other while remaining electrically isolated from each other, as illustrated in FIG. 2D. In some examples, touch screen 260 can sense the self-capacitance of touch electrodes 262 and 264 to detect touch and/or proximity activity on touch screen 260, and/or in some examples, touch screen 260 can sense the mutual capacitance between touch electrodes 262 and 264 to detect touch and/or proximity activity on touch screen 260.

FIG. 2E illustrates touch screen 270 with touch node electrodes 272 arranged in a pixelated touch node electrode configuration according to examples of the disclosure. Specifically, touch screen 270 can include a plurality of individual touch node electrodes 272, each touch node electrode identifying or representing a unique location on the touch screen at which touch or proximity activity is to be sensed, and each touch node electrode being electrically isolated from the other touch node electrodes in the touch screen/panel, as previously described. Touch node electrodes 272 can be on the same or different material layers of touch screen 270. In some examples, touch screen 270 can sense the self-capacitance of touch node electrodes 272 to detect touch and/or proximity activity on touch screen 270, and in some examples, touch screen 270 can sense the mutual capacitance between touch node electrodes 272 to detect touch and/or proximity activity on touch screen 270.

In some examples, the touch and display integrated circuit (e.g., the touch and display integrated circuit 212) can be operated in multiple power domains. In some examples, touch and display operation can be time-multiplexed (e.g., as described below with reference to FIG. 3A). An integrated touch and display integrated circuit (e.g., fabricated as a chip), for example, can operate in a guarded power domain during the touch operation and can operate in a system power domain during display operations. During the touch operation, the display pixels states can be maintained with reference to the guarded power domain and during the display operation, the display pixels can be refreshed with reference to the system power domain. In some examples, touch and display operation can be partially or fully concurrent (e.g., as described below with reference to FIG. 5A). The display pixels can be refreshed and/or display pixels states can be maintained with reference to the guarded power domain during the concurrent touch and display operation and can the display pixels can be refreshed and/or display pixels states maintained with reference to the system power domain during display operations that are not concurrent with touch operations. Operating the touch and display integrated circuit in the guarded domain during the touch operations can improve touch performance by reducing parasitic capacitances in the touch sensing system.

Figure 3A:
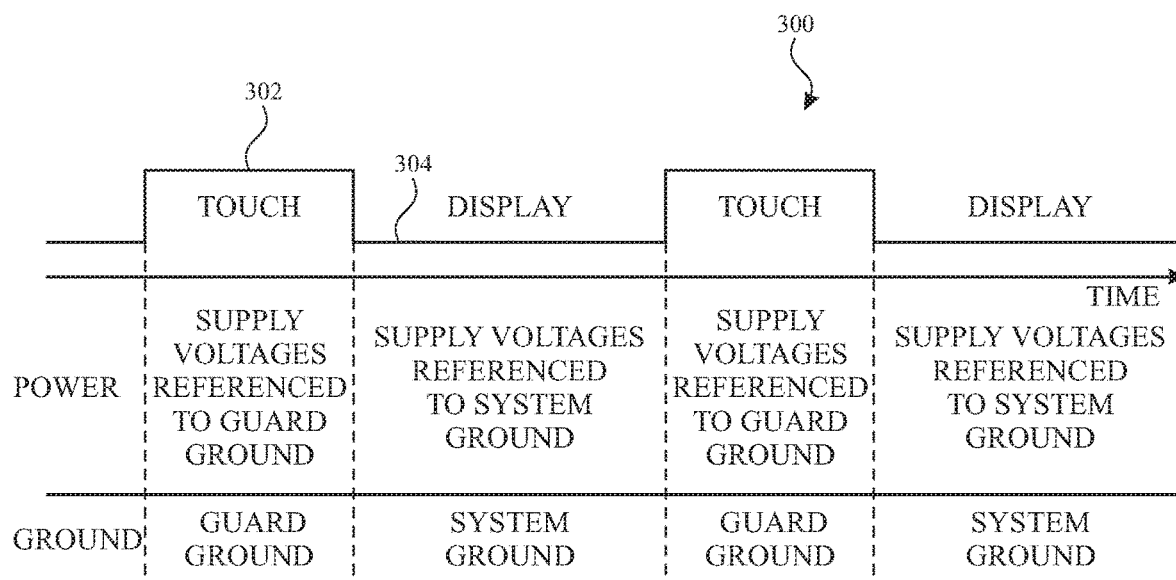
FIG. 3A illustrates an exemplary timeline for time-multiplexing touch and display operations and corresponding power domains for a device according to examples of the disclosure.

FIG. 3A illustrates an exemplary timeline 300 for time-multiplexing touch and display operations and corresponding power domains for a device according to examples of the disclosure. As illustrated, a touch mode 302 can be alternated with a display mode 304 such that the two modes can be mutually exclusive in time (non-concurrent). During touch mode 302, touch electrodes can be driven and/or sensed to detect objects touching and/or proximate to a touch screen of the device and the display can maintain an image (e.g., maintain the state of the display pixels). As illustrated below timeline 300, the touch and display integrated circuit can be operated in the guarded domain for guarded touch sensing scans (e.g., guarded self-capacitance scans) in which the ground for the touch and display integrated circuit can be guard ground and the touch and display integrated circuit can be powered by supply voltages referenced to guard ground. During display mode 304, the display can be refreshed to update the image on the display. As illustrated below timeline 300, the touch and display integrated circuit can be operated in the system domain for display operation in which the ground for the touch and display integrated circuit can be system ground and the touch and display integrated circuit can be powered by supply voltages referenced to system ground. The duration of each mode can be the same (or different), and can depend on other functions of the device. For example, touch mode 302 can occur while the display is not being refreshed (e.g., during inter-frame or intra-frame pauses in the display refresh, which may be of the same or different duration). In some examples, a touch image for the touch screen can be generated during touch mode 302 and one display image can be displayed on the touch screen during a display mode 304. In some examples, the multiple touch images for the touch screen can be generated during touch mode 302 and/or one or more display images can be displayed on the touch screen during the display mode 304. In some examples, the touch sensing can be divided among multiple touch mode periods during which a portion of a touch image can be generated and/or display refresh operations can be divided among multiple display mode periods during which a portion of the display can be updated.

Figure 3B:
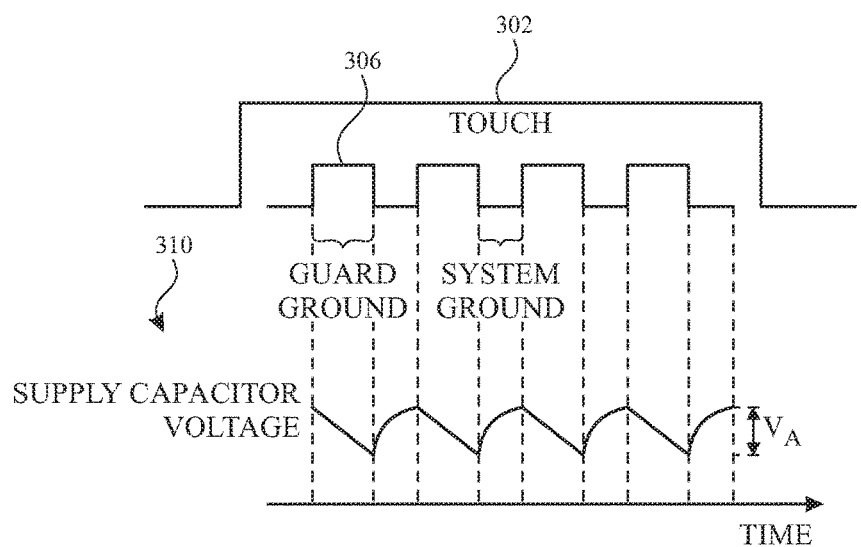
FIG. 3B illustrates an exemplary stimulation waveform during touch mode and a corresponding exemplary voltage waveform for a supply capacitor according to examples of the disclosure.

Although FIG. 3A illustrates operation of the touch and display integrated circuit in the guarded domain for the duration of touch mode 302, in some examples, rather than operating in the guarded domain for the duration of touch mode 302, touch and display integrated circuit can be operated in the guarded domain for a portion of touch mode 302 and in the system domain for a portion of touch mode 302. FIG. 3B illustrates an exemplary stimulation waveform during touch mode 302 (and a corresponding exemplary voltage waveform for a supply capacitor as described in more detail below) according to examples of the disclosure. As illustrated in FIG. 3B, the stimulation waveform 306 applied during a touch mode 302 can be a square wave (although other waveforms are possible, such as a trapezoidal wave, etc.) with a low voltage level equal to system ground and a high voltage level equal to the guard signal voltage. Thus, when the stimulus is high, the touch and display integrated circuit can operated in the guarded domain, referenced to the guard voltage/ground, and when the stimulus is low, the touch and display integrated circuit can operated in the system domain referenced to the system ground.

Figure 4A:
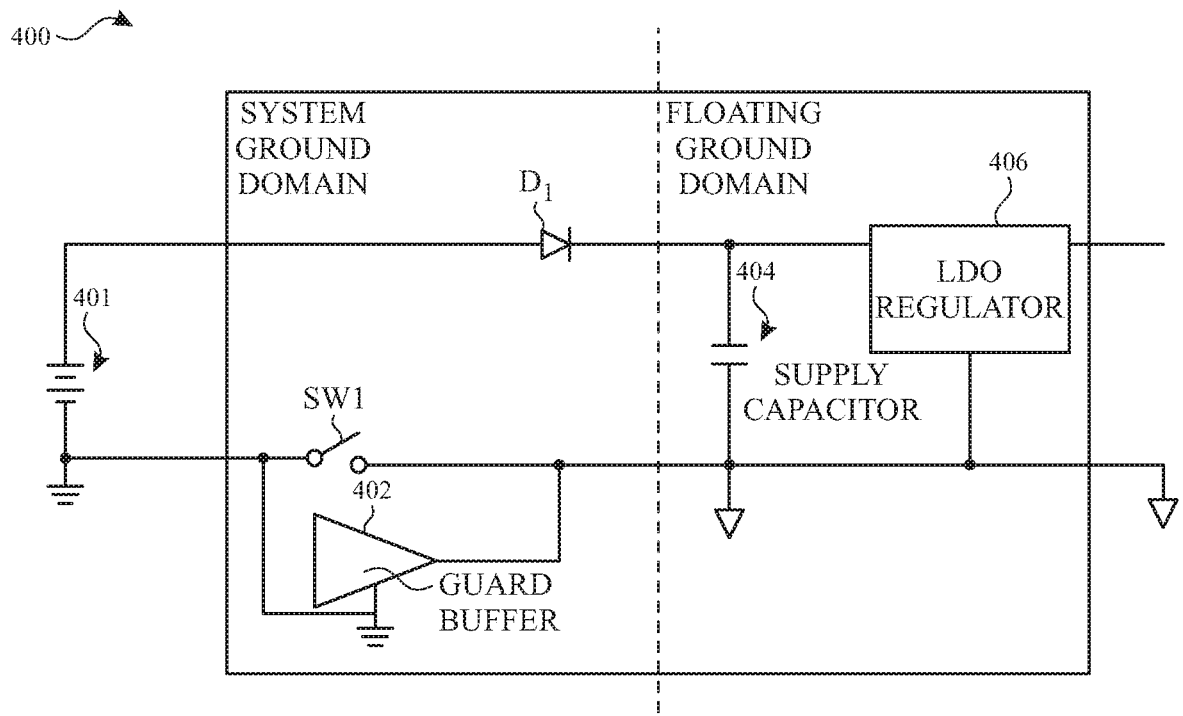
FIG. 4A illustrates an exemplary guard and power management integrated circuit according to examples of the disclosure.

As described herein, a touch and display integrated circuit may operate in multiple power domains. A guard and power management integrated circuit can be used to operate the touch and display integrated circuit in the appropriate power domain with the corresponding supply voltages. FIG. 4A illustrates an exemplary guard and power management integrated circuit according to examples of the disclosure. Guard and power management integrated circuit 400 can include a guard buffer 402 (e.g., corresponding to guard source 254) referenced to system ground and configured to generate a guard signal at its output. In some examples the guard signal can be a square or trapezoid wave with a high voltage at Vguard and a low voltage at system ground. Guard and power management integrated circuit 400 can include a supply capacitor 404 and a voltage regulator 406 (e.g., a low drop out (LDO) regulator). During non-guarded operation (e.g., during display mode 304 or a non-guarded touch operation), power can be supplied from battery 401 to the supply capacitor 404 and LDO regulator 406 via switch SW1 (in the closed state) and diode D1 (in the "on" state where the voltage of battery 401 is greater than supply capacitor 404 by at least the turn-on voltage of diode D1). Guard buffer 402 can be turned off or its output can be in a high impedance state or coupled to the system ground voltage. The supply capacitor 404 can be charged from battery 401 and can be referenced to system ground. LDO regulator 406 can be system ground referenced and output a regulated supply voltage generated from the battery power. During guarded operation (e.g., during touch mode 302 or a guarded touch operation), supply capacitor 404 and LDO regulator 406 can be isolated from battery 401 (system power domain) via switch SW1 (in the opened state) and diode D1 (in the "off" state where the voltage of battery 401 is equal to the voltage on supply capacitor 404 greater than the supply capacitor 404 by less than the turn-on voltage of diode D1). Guard buffer 402 can generate the guard signal. The supply capacitor 404 can therefore be referenced to the guard ground (e.g. the guard signal) and LDO regulator 406 can be guard ground referenced and output a regulated supply voltage generated from supply capacitor 404. Thus, in the guarded mode, the output of guard and power management integrated circuit 400 can be guard domain power and ground voltages that can be floating relative to the system power domain. In some examples, rather than using diode D1, which can have a 0.3 V-0.7 V voltage drop, a switch can be used, as described below with reference to FIG. 4B-4C. Additionally, in some examples, rather than using a supply capacitor 404, a battery (e.g., a rechargeable battery) could be used to power the touch and display integrated circuit during guarded operations.

As illustrated in FIG. 4A, the touch and display operation can be powered by supply capacitor 404 in guarded domain rather than by battery 401. To reduce the power draw on supply capacitor 404 (and thereby reduce the size and cost of supply capacitor 404), operation in the guarded domain can be limited to guarded touch operations (e.g., during touch mode 302 illustrated in FIG. 3A). During non-guarded operation (e.g., during display mode 304 illustrated in FIG. 3A), the device operation can be powered by battery 401. By time-multiplexing, the relatively power-intensive display operations (compared to touch) can occur in the system power domain and operate from the relatively large system power supply (battery 401). Additionally, to further reduce the power draw on supply capacitor 404 (and thereby further reduce the size and cost of supply capacitor 404), operation in the guarded domain can be limited to guarded portions of touch operations (e.g., while the touch stimulation is high as illustrated in FIG. 3B). During non-guarded operations (e.g., during display mode 304 illustrated in FIG. 3A or while the touch stimulation is low as illustrated in FIG. 3B), the device operation can be powered by battery 401. In addition to reducing the size/costs of the supply capacitor because the total duration of power draw on the supply capacitor is reduced, the size/cost of the supply capacitor can be further reduced because by alternating charging and discharging of the supply capacitor (shorter power draw durations). For example, referring back to FIG. 3B, plot 310 illustrates exemplary voltage of supply capacitor 404. In the guarded domain (when touch stimulation is high), the touch and display integrated circuit can draw power from supply capacitor 404, thereby reducing the voltage on supply capacitor 404. In the system domain (when touch stimulation is low), the touch and display integrated circuit can draw power from battery 401 and supply capacitor 404 can re-charge. The change in voltage on the supply capacitor from charge and discharge (represented by VA), can be relatively small due to the frequency of charging. In contrast, were the touch and display integrated circuit to draw power from supply capacitor 404 during touch mode 302, without intermittent recharging, the change in voltage on the supply capacitor would be far larger than VA, requiring a larger capacitor to maintain the voltage.

It should be understood that FIG. 4A shows a simplified view of the guard and power management integrated circuit 400 with one system domain supply voltage (e.g., the output of battery 401) and one supply capacitor 404 and one voltage regulator 406 for operation in the guarded domain. In some examples, additional voltages may be required in the system and/or guarded domain, and as a result, there may be additional voltage regulators and supply capacitors.

Figure 4B:
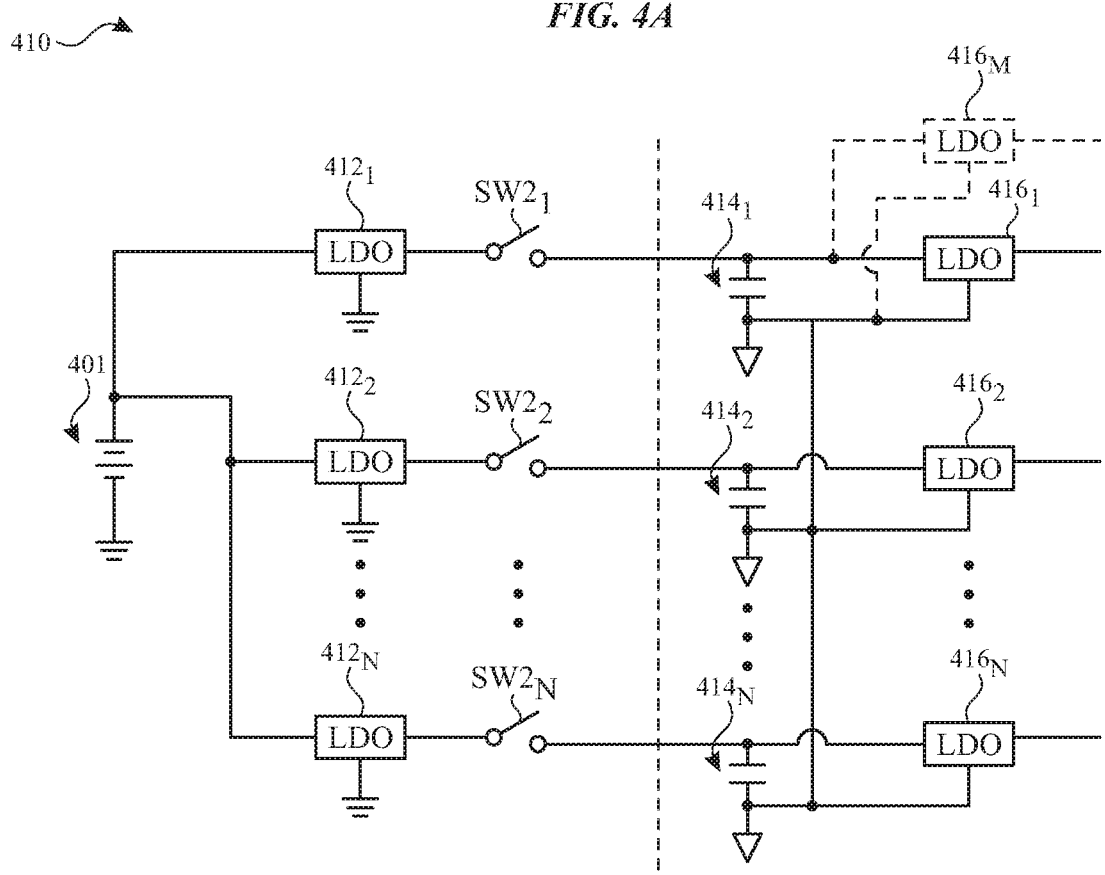
FIG. 4B illustrates an exemplary guard and power management integrated circuit including multiple regulators and supply capacitors according to examples of the disclosure.

FIG. 4B illustrates an exemplary guard and power management integrated circuit including multiple regulators and supply capacitors according to examples of the disclosure. For example, guard and power management integrated circuit 410 can include multiple system supply voltages including from battery 401 and from regulators $412_{1-N}$ (which may or may not be implemented as part of guard and power management integrated circuit 410), and the floating domain can includes multiple supply capacitors $414_{1-N}$ and multiple guard domain regulators $416_{1-N}$. In some examples, there can be a one-to-one correspondence such that each power supply voltage (e.g., supplied by each of regulators $412_{1-N}$) can be provided via switches $SW_{1-N}$ during non-guarded operation to charge a corresponding supply capacitor $414_{1-N}$. In some examples, fewer system domain power supplies may be used (e.g., battery 401 as in FIG. 4A or some subset of the regulators $412_{1-N}$. Additionally, there can be a one-to-one correspondence such that each supply capacitor $414_{1-N}$ can power one corresponding guard domain regulator $416_{1-N}$ during guarded operation. In some examples, there may be more guard domain regulators than supply capacitors. For example, one supply capacitor can supply power for each of the guard domain regulators $416_{1-N}$. In some examples, a supply capacitor can supply power for more than one guard domain regulator. For example, as illustrated in FIG. 4B, supply capacitor $414_1$ can supply power for guarded domain regulator $416_1$ and $416_M$. In some example, the one-to-one correspondence can provide more power-efficient design than operating regulators $416_{1-N}$ from the voltage of battery 401. Additionally, the use of multiple supply capacitors $414_{1-N}$ for multiple regulators $416_{1-N}$ can reduce the size and/or distribute the size of the supply capacitor(s).

Figure 4C:
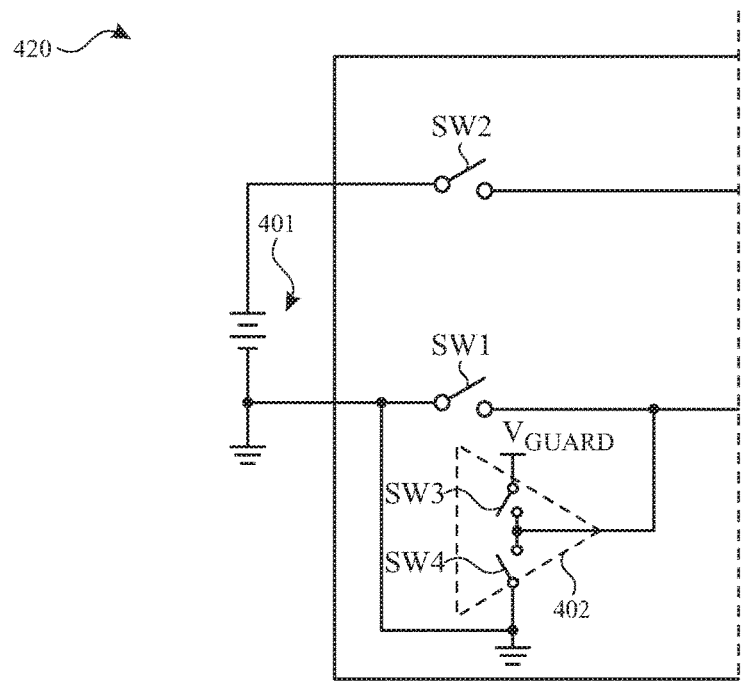
FIG. 4C illustrates an exemplary implementation of a portion of guard and power management integrated circuit using switches according to examples of the disclosure.

FIG. 4C illustrates an exemplary implementation of a portion of guard and power management integrated circuit using switches according to examples of the disclosure. Unlike in FIG. 4A, diode D1 can be replaced with switch SW2. Additionally, guard buffer 402 can be conceptualized and/or implemented with switch SW3 coupled to Vguard and switch SW4 coupled to system ground. Switches SW1-4 can be controlled, for example, by signals from host processor 220. In some examples, the switch operation can be synchronized such that switches SW1, SW2 and SW4 open and switch SW3 closes at the same time for guarded operation, and switches SW1, SW2 and SW4 close and switch SW3 opens at the same time for non-guarded operation. Although four switches are illustrated in FIG. 4C, it is understood that switches SW1 and SW4 can have the same function of coupling system ground to the guard ground. One of these switches can be omitted for this reason. In some examples, use of switches SW1 and SW4 can decouple the design of guard buffer 402 from switch SW1, because switches SW1 and SW2 may be designed to handle the power requirements for recharging supply capacitor 404, whereas switch SW4 may be designed with simpler power requirements.

In some examples, the timing of switches SW1-SW4 can be optimized to minimize power losses in the system. For example, in the transition from guarded operation to non-guarded operation, guard buffer can first transition from Vguard to system ground by opening switch SW3 and simultaneously closing switches SW1 and SW4, and once the output of guard buffer is system ground, then switch SW2 can be closed. Closing switch SW2 before the guard buffer settles to system ground can cause the supply capacitor 404 to back-power the system battery 401 (which can be wasteful due to energy losses in transmission and in back-charging battery 401. In some examples, SW2 can be closed before the voltage output by the guard buffer is at system ground because of the power draw on supply capacitor 404 during guarded operation can reduce its voltage (as shown in plot 310 in FIG. 3B). For example, when the output of the guard buffer reaches within VA of the system ground, switch SW2 can close without back-powering battery 401 (e.g., because the voltage on battery 401 can be greater than or equal to the voltage on supply capacitor 404 including the boosted ground). In some examples, switch SW2 can be closed after some delay after the output of the guard buffer reaches system ground (or after the output of the guard buffer reaches within VA of the system ground). However, such delays can delay the recharging of the supply capacitor and cause the touch and display integrated circuit to further drain the supply capacitor rather than operating from battery 401 (which may waster power and requiring a larger supply capacitor). Additionally, although switches SW1 and SW4 are described above as operating synchronously (and having the same function), in some examples, switch SW1 can be controlled to close after SW4 (on the transition from guarded to non-guarded operation) to ensure that the guard buffer does not drive to the system ground before its output is at the system ground.

Figure 4D:
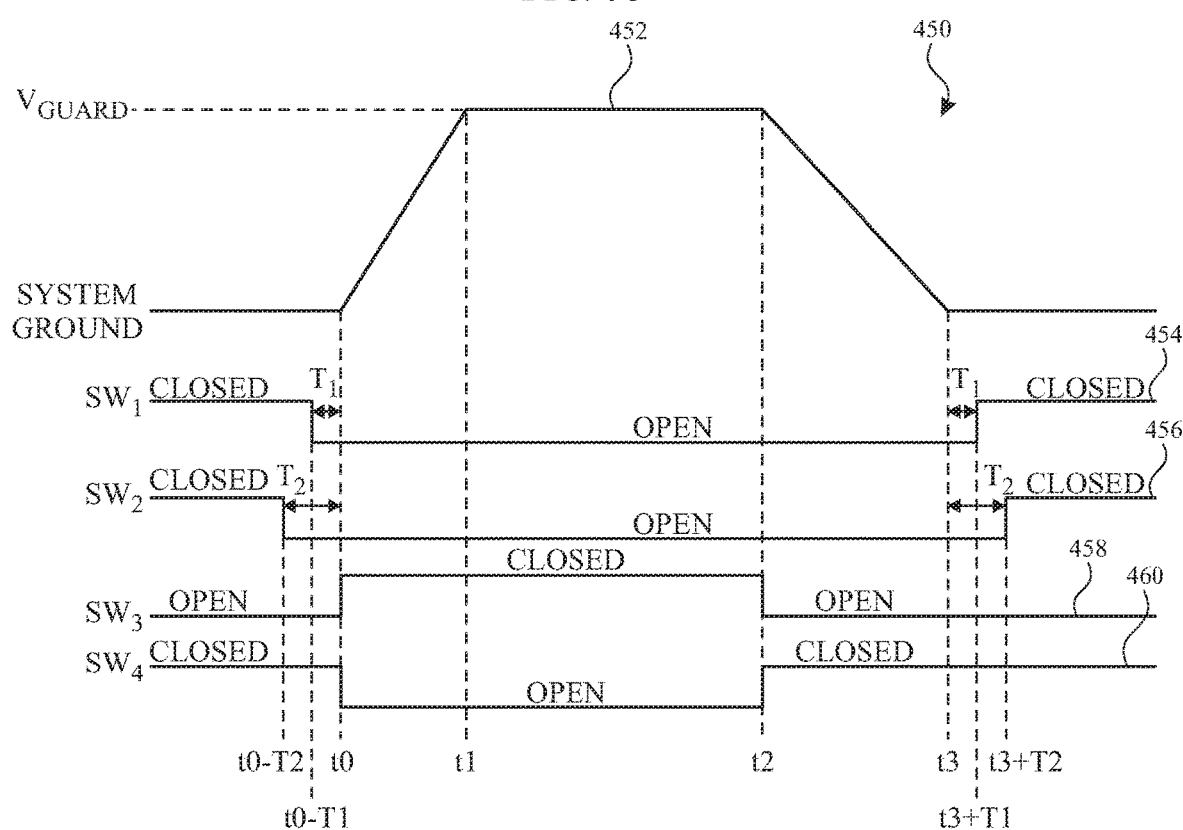
FIG. 4D illustrates an exemplary timing diagram that could be used for operation of switches illustrated in FIG. 4C according to examples of the disclosure.

FIG. 4D illustrates an exemplary timing diagram 450 that could be used for operation of switches SW1-SW4 illustrated in FIG. 4C according to examples of the disclosure. In FIG. 4D, the guard signal 452 generated by the output of the guard buffer (e.g., guard buffer 402) can be a trapezoidal wave with a high voltage of Vguard and a low voltage of system ground. Guard signal 452 can transition between the high voltage and the low voltage using switches SW3 and SW4. For example, guard signal 452 can transition from low to high between t0 and t1 in response to switch SW3 opening and switch SW4 closing (e.g., simultaneously or nearly simultaneously within a threshold period of time). Likewise guard signal 452 can transition from high to low between t2 and t3 in response to switch SW3 closing and switch SW4 opening (e.g., simultaneously or nearly simultaneously within a threshold period of time). The timing of switches SW1 and/or SW2 can be relative to the guard waveform. For example, SW1 and SW2 can be closed prior to the transition of the guard signal from low to high (e.g., at which time the guard ground can be at the system ground and the floating domain can be powered with system referenced voltage supplies). Switches SW1 and SW2 can then switch open in preparation for the transition. For example, switch SW1 can open a period T1 prior to the beginning of the transition at t0 and switch SW2 can open a period T2 (greater than T1) prior to the beginning of the transition at t0. As the transition of the guard signal approaches, switch SW2 can open at t0-T2, decoupling the floating domain from the system ground, and then switch SW1 can open at t0-T1, decoupling the floating domain regulators and supply capacitor from the battery (or system side regulators). Switches SW1 and SW2 can remain open for the remainder of the transition from low to high (from t0 to t1), while the guard signal is high (from t1 to t2), and during the transition from high to low (from t2 to t3). During this period the supply capacitor can provide power for guard domain regulators references to the guard ground (e.g., floating relative to the system ground using the guard signal). Switches SW1 and SW2 can then switch closed after the transition from high to low. For example, switch SW1 can close a period T1 after the end of the transition at t3 and switch SW2 can close a period T2 (greater than T1) after the end of the transition at t3. Closing switches SW1 and SW2 can recouple the floating domain to the system power supply and the system ground. It should be understood that timing diagram 450 is illustrative and that different timing is possible. For example, the duration of T1 and T2 can be different for the rising and falling edge transitions. In some examples, the switches SW1 and/or SW2 can close earlier on the falling edge of guard signal 452 due to the change in voltage on the supply capacitor (e.g., VA as illustrated in FIG. 3B). The timing can be optimized for power efficiency to avoid back-powering and/or driving a ground.

In some examples, touch and display operation can be partially or fully concurrent. In such examples, touch and display integrated circuit may perform concurrent touch and display operations in the guarded domain. In such examples, the supply capacitor(s) may need to be designed to account for the larger power draw of operating both the touch and display operations in the guarded domain. FIG. 5A illustrates an exemplary timeline 500 for partially concurrent touch and display operations and corresponding power domains for a device according to examples of the disclosure. Although primarily described as partially concurrent, it should be understood that the touch and display operations may be fully concurrent, in some examples. As illustrated, during period 502, touch and display operations can be concurrent, during period 504, display operations can be independent of touch operations, and during period 505, the system may idle (e.g., touch and display operations may not occur). During period 502, touch electrodes can be driven and/or sensed to detect objects touching and/or proximate to a touch screen of the device and the display can refresh and/or maintain an image. As illustrated below timeline 500, the touch and display integrated circuit can be operated in the guarded domain for concurrent guarded touch sensing scans (e.g., guarded self-capacitance scans) and display operation during period 502 in which the ground for the touch and display integrated circuit can be guard ground and the touch and display integrated circuit can be powered by supply voltages referenced to guard ground. During period 504, the display can continue to be refreshed and/or be maintained. As illustrated below timeline 500, the touch and display integrated circuit can be operated in the system domain for display operation during period 504 in which the ground for the touch and display integrated circuit can be system ground and the touch and display integrated circuit can be powered by supply voltages referenced to system ground. During period 505, touch and display integrated circuit can be in the system ground domain or may be powered down or placed in a low power state to conserve power. The duration of each period can be the same (or different). For example, the duration of the display update (during period 502 and 504) may be a function of the size of the display (e.g., the number of pixels to refresh and/or maintain). The duration of the concurrent touch and display operations (during period 502) may be a function of the size of the touch sensor panel, the touch sensing circuitry and the type of touch sensing scans. The duration of the system idle may be a function of the frame rate of the display and/or the touch sensing rate. In some examples, the touch sensing can be divided among multiple concurrent touch and display operation periods (and/or some touch only sensing periods during intra-frame or inter-frame pauses in the display refresh). In some examples, the display operations can be divided among multiple display operation periods including some concurrent touch and display periods and some display only periods.

Although FIG. 5A illustrates operation of the touch and display integrated circuit in the guarded domain for the duration of period 502, in some examples, rather than operating in the guarded domain for the duration of period 502, touch and display integrated circuit can be operated in the guarded domain for a portion of period 502 and in the system domain for a portion of period 502. FIG. 5B illustrates an exemplary stimulation waveform during period 502 (and a corresponding exemplary voltage waveform for a supply capacitor as described in more detail below) according to examples of the disclosure. As illustrated in FIG. 5B, the stimulation waveform 506 applied during period 502 can be a square wave (although other waveforms are possible, such as a trapezoidal wave, etc.) with a low voltage level equal to system ground and a high voltage level equal to the guard signal voltage (Vguard). Thus, when the stimulus is high, the touch and display integrated circuit can operated in the guarded domain, referenced to the guard voltage/ground, and when the stimulus is low, the touch and display integrated circuit can operated in the system domain referenced to the system ground.

As illustrated in FIG. 4A, the touch and display operation can be powered by supply capacitor 404 in guarded domain rather than by battery 401. To reduce the power draw on supply capacitor 404 (and thereby reduce the size and cost of supply capacitor 404), operation in the guarded domain can be limited to guarded touch operations (e.g., during period 502 illustrated in FIG. 5A). During non-guarded operation (e.g., during period 504 illustrated in FIG. 5A), the device operation can be powered by battery 401. By operating in the guarded domain during period 502, the relatively power-intensive display operations (compared to touch) can occur mainly in the system power domain and operate from the relatively large system power supply (battery 401) during period 504. Additionally, to further reduce the power draw on supply capacitor 404 (and thereby further reduce the size and cost of supply capacitor 404), operation in the guarded domain can be limited to guarded portions of period 502 (e.g., while the touch stimulation is high as illustrated in FIG. 5B). During non-guarded operations (e.g., while the touch stimulation is low as illustrated in FIG. 5B), the device operation can be powered by battery 401. In addition to reducing the size/costs of the supply capacitor because the total duration of power draw on the supply capacitor is reduced, the size/cost of the supply capacitor can be further reduced because by alternating charging and discharging of the supply capacitor (shorter power draw durations). For example, referring back to FIG. 5B, plot 510 illustrates exemplary voltage of supply capacitor 404. In the guarded domain (when touch stimulation is high), the touch and display integrated circuit can draw power from supply capacitor 404, thereby reducing the voltage on supply capacitor 404. In the system domain (when touch stimulation is low), the touch and display integrated circuit can draw power from battery 401 and supply capacitor 404 can re-charge. The change in voltage on the supply capacitor from charge and discharge (represented by $V_B$), can be relatively small due to the frequency of charging. In contrast, were the touch and display integrated circuit to draw power from supply capacitor 404 during period 502, without intermittent recharging, the change in voltage on the supply capacitor would be far larger than $V_B$, requiring a larger capacitor to maintain the voltage. It should be understood that because both the touch operations and display operations are occurring during period 502, that the draw on the supply capacitor, $V_B$, can be greater than the draw on the supply capacitor, VA, when touch operations are time-multiplexed with display operations as illustrated in FIG. 3B.

In addition to providing generating the guard signal and providing guard and/or system domain voltage supplies to the touch and display integrated circuit, the guard and power management integrated circuit can also provide for reliable data communications between the touch and display integrated circuit and another device (e.g., host processor 220). In particular, when operating the host processor in the system power domain and the touch and display integrated circuit in the guarded power domain, the data communications therebetween can be degraded. For example due to the different ground references on different ends of the communication link, over voltage or under voltage signals may appear and provide incorrect data across the data communication link. It should be understood that the data communication may include any applicable data such as configuration data for the touch and display integrated circuit (e.g., power on/reset configuration, scan plans, etc.), status information regarding host processor and/or touch and display integrated circuit, display pixel data for display of one or more images on the touch screen, touch data/input for processing by the host processor, etc. It should be understood that the data communication link may use any suitable communications protocols such as for an inter-integrated circuit (I2C) interface, a serial peripheral interface (SPI), a mobile industry processor interface (MIPI), or the like.

Figure 6A:
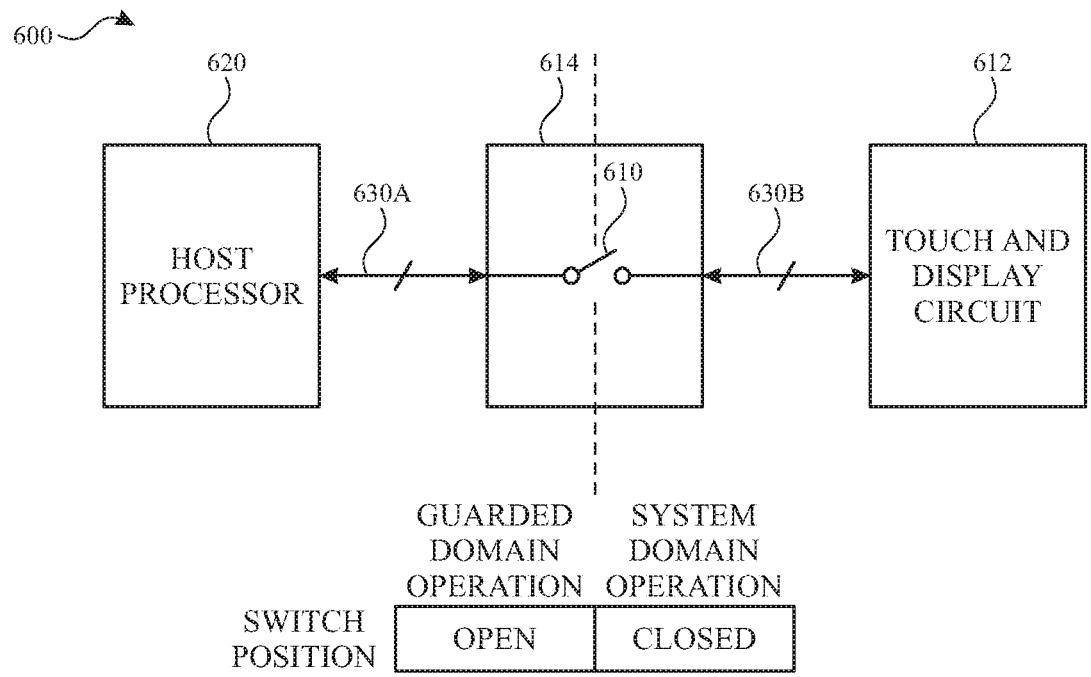
FIG. 6A illustrates an exemplary configuration for data communications between a host processor and a touch and display integrated circuit according to examples of the disclosure.

In some examples, display and touch data communications between an integrated touch and display integrated circuit operating in a guarded power domain and another integrated circuit (e.g., host processor) operating in a system power domain can operate during non-guarded operation (e.g. during display mode 304) and can be suspended during guarded operation (e.g., during touch operation). FIG. 6A illustrates an exemplary configuration for data communications between a host processor and a touch and display integrated circuit according to examples of the disclosure. Configuration 600 can include host processor 620 (e.g., corresponding to host processor 220), touch and display integrated circuit 612 (e.g., corresponding to touch and display integrated circuit 212) and guard and power management integrated circuit 614 (e.g., corresponding to guard and power management integrated circuit 214) disposed between host processor 620 and touch and display integrated circuit 612. Guard and power management integrated circuit can include switching circuitry (e.g., illustrated by switch 610) to couple the host processor side of n-bit data communication link 630A to the touch and display circuit side of n-bit data communication link 630B or to decouple the data communication link. Although one switch 610 is illustrated in FIG. 6A, it should be understood that n switches can be included to handle the n-bit data communication link. Additionally, it should be understood that other switching circuitry can be used (e.g., one or more multiplexers, etc.). The switching circuitry can be configured to decouple the two sides of the data communication link during guarded operation (e.g., during touch mode 302) when host processor 620 operates in the system power domain and touch and display integrated circuit 612 operates in the guarded power domain, as indicated in FIG. 6A by switch 610 being in the open position during guarded domain operation by touch and display integrated circuit 612. The switching circuitry can be configured to couple the two sides of the data communication link during non-guarded operation (e.g., during display mode 304), as indicated in FIG. 6A by switch 610 being in the closed position during system domain operation by touch and display integrated circuit 612.

Configuration 600 in FIG. 6A can prevent degradation of the data communications by preventing communications while the two sides of the communication link are operating in different power domains. Such a configuration can be useful when touch and display integrated circuit 612 operates in a time-multiplexed manner. However, in some examples, communication may be desired or required even during the guarded operation. For example, when touch and display operations are not time-multiplexed (e.g., as illustrated in FIG. 5A), display data may need to be communicated from host processor 620 to touch and display integrated circuit 612 while touch and display integrated circuit is operating in the guarded domain to concurrently perform a guarded self-capacitance scan. In some examples, the display and touch data communications between an integrated touch and display integrated circuit and the host processor can operate during guarded or non-guarded operation using level shifters.

Figure 6B:
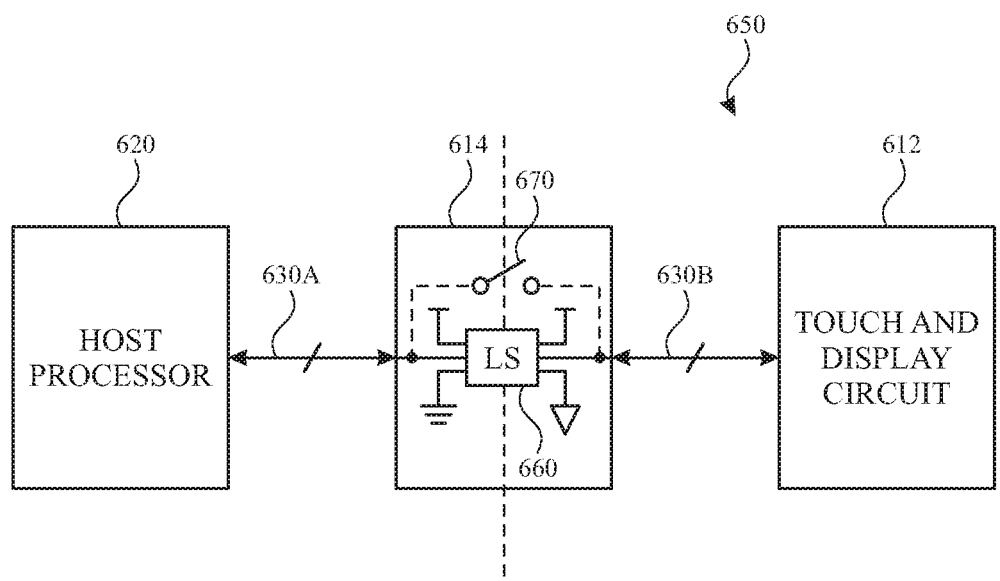
FIG. 6B illustrates another exemplary configuration for data communications between a host processor and a touch and display integrated circuit according to examples of the disclosure.

FIG. 6B illustrates another exemplary configuration for data communications between a host processor and a touch and display integrated circuit according to examples of the disclosure. Like configuration 600 in FIG. 6A, configuration 650 can include host processor 620, touch and display integrated circuit 612 and guard and power management integrated circuit 614 to interface between the host processor side of n-bit data communication link 630A to the touch and display circuit side of n-bit data communication link 630B. Unlike configuration 600 in FIG. 6A, guard and power management integrated circuit 614 in configuration 650 can include level shifting circuitry (e.g., illustrated by level shifter 660) to account for differences in the power domains (when a difference exists) on the two ends of the data communication link. Although one level shifter 660 is illustrated in FIG. 6B, it should be understood that n level shifters can be included to handle the n-bit data communication link. Level shifter 660 could be implemented using a DC level shifter or a capacitive level shifter, among other possibilities.

In some examples, the amount of data that host processor 620 may need to communicate to/from touch and display integrated circuit 612 can be substantial, and level-shifting the data between the power domains can slow down the speed of such communication. Therefore, in some examples, guard and power management integrated circuit 614 can include a bypass switching circuit (e.g., illustrated bypass switch 670), which can bypass level shifter 660 on the communication link between host processor 620 and touch and display integrated circuit when both operate in the same system domain and increase the data communication rate. For example, when touch and display integrated circuit 612 operates in the guarded domain, switch 670 can be in the open position, and level shifter 660 can provide for reliable communications between the two power domains. When touch and display integrated circuit 612 operates in the system domain, switch 670 can be in the closed position, bypassing level shifter 660 for higher speed communications (relative to communications via level shifter 660).

Although switching circuitry in FIG. 6A and levels shifting circuitry and/or switching circuitry in FIG. 6B are illustrated as part of guard and power management integrated circuit 614, it should be understood that this circuitry can be implemented in a different integrated circuit (e.g., a different chip). In some examples, although the circuitry of the guard and power management integrated circuit FIGS. 4A-4C are illustrated and described separately from the circuitry of the guard and power management integrated circuit of FIGS. 6A-6B, it should be understood that the circuitry can, in some examples, be included in the same integrated circuit (e.g., a chip) given that both are configured to account for differences in power domains between the host processor and the touch and display integrated circuit. In some examples, the circuitry of FIGS. 4A-4C and 6A-6B can be implemented in multiple integrated circuits, rather than a monolithic guard and power management integrated circuit (e.g., as illustrated by guard and power management integrated circuit 214 in FIG. 2A). For example, the functionality described herein can be divided into a guard chip configured to generate the guard voltage, a power management chip configured to provide guard and/or system referenced supply voltages to the touch and display integrated circuit, and a data communication interface chip configured to couple/decouple or level-shift (and/or bypass the level shifter the data communication link between the host processor and the touch and display integrated circuit.

Figure 7:
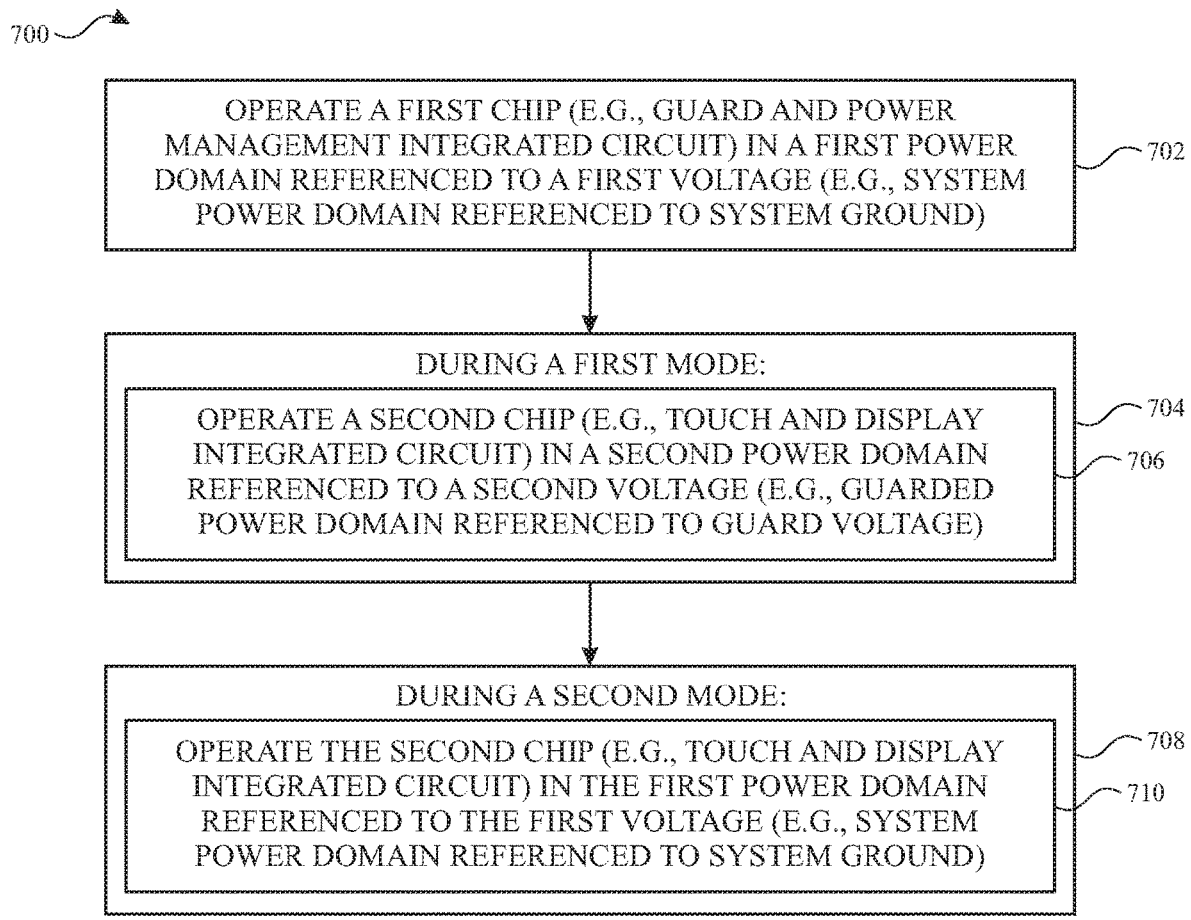
FIG. 7 illustrates an exemplary process for operating a touch and display integrated circuit in multiple power domains according to examples of the disclosure.

FIG. 7 illustrates an exemplary process 700 for operating a touch and display integrated circuit in multiple power domains according to examples of the disclosure. Process 700 can include operating (702) a first chip (e.g., a guard and power management integrated circuit 214) in a first power domain referenced to a first voltage (e.g., system power domain referenced to system ground). In some examples, the first chip can be configured to generate a second voltage (e.g., a guard voltage). A second chip (e.g., touch and display integrated circuit 212) can operate in either the first power domain referenced to the first voltage (e.g., system power domain referenced to system ground) or a second power domain referenced to a second voltage (e.g., a guarded power domain referenced to guard ground).

In some examples, process 700 includes, during a first mode (704) (e.g., corresponding to guarded operation), operating (706) the second chip in the second power domain referenced to a second voltage (e.g., a guarded power domain referenced to guard ground). In some examples, the second chip (e.g., touch and display integrated circuit) can be configured to perform touch operations (e.g., a guarded self-capacitance scan) for a touch screen. The second chip (e.g., touch and display integrated circuit) can be further configured to maintain display of an image displayed on the touch screen with reference to the second voltage (e.g., guard voltage) during the first mode (guarded operation for touch operations as illustrated in FIG. 3A, for example). In some examples, during the first mode (guarded operation for concurrent touch and display as illustrated in FIG. 5A, for example), the second chip can be further configured to perform display operations (e.g., display refresh) for the touch screen with reference to the second voltage (e.g., guard voltage). In some examples, process 700 includes, during a second mode (708) (e.g., corresponding to non-guarded operation), operating the second chip (e.g., touch and display integrated circuit) in the first power domain referenced to the first voltage (e.g. system power domain). The second chip can be configured to perform display operations (e.g., display refresh and/or maintaining the display for the touch screen, in some examples (e.g., as illustrated in non-guarded display periods).

Operating the touch and display integrated circuit in multiple power domains can also impact data communication with the touch and display integrated circuit and a host processor. For example, during the first mode (e.g., guarded operation), a data communication link between the second chip (e.g., touch and display integrated circuit) that operates in a second power domain (e.g., guarded power domain) and a third chip (e.g., host processor) that operates in the first power domain (e.g., a system power domain) can be decoupled. During the second mode (non-guarded operation), the data communication link between the second chip and the third chip (both operating in the system power domain) can be coupled for data communications. Because the second and third chips may operate in the same power domain (e.g., without a need for adjusting the voltage of the data on the data communication link). In some examples, the data communication link can remain coupled in the first and second modes. The voltage of data on the data communication link can be adjusted (e.g., with level shifters) to account for the different power domains for the second chip and the third chip. In some examples, the voltage adjustment can be bypassed (e.g., with a bypass switch) when the second chip and the third chip operate in the same power domain.

Figure 8:
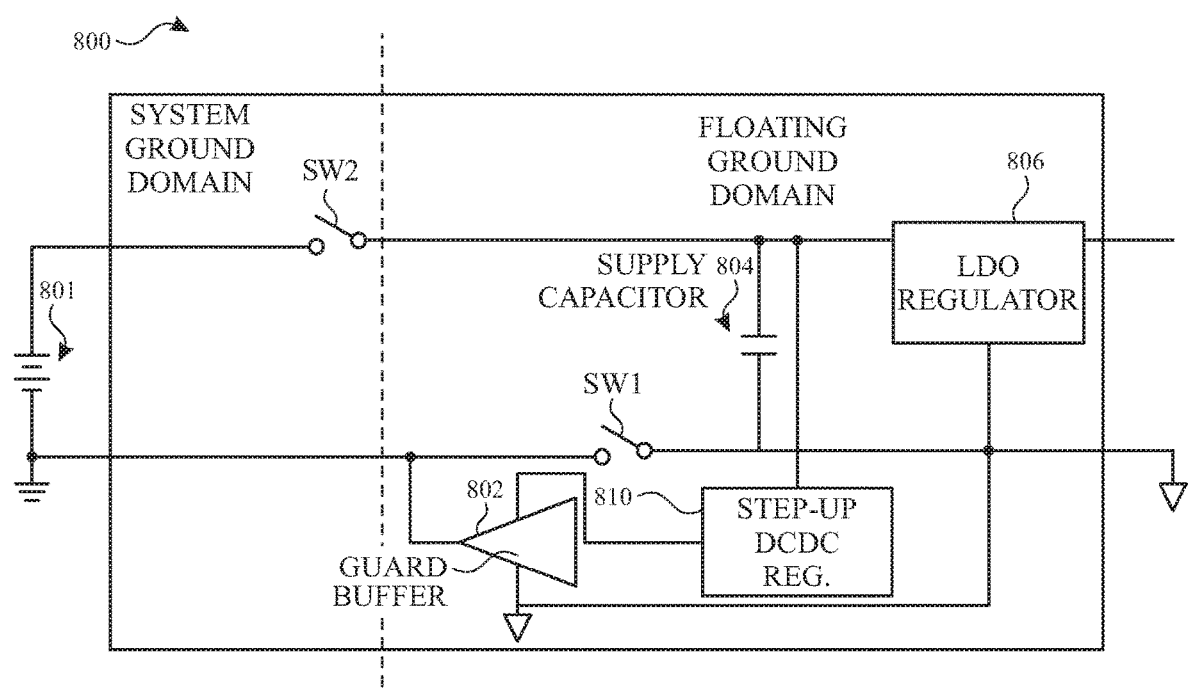
FIG. 8 illustrates another exemplary guard and power management integrated circuit according to examples of the disclosure.

The operation described above primarily focuses on a guard buffer (e.g., guard buffer 402) referenced to system ground (system ground domain) and configured to generate a guard signal at its output, which is representative of the guarded ground (floating ground domain) for guarded operation. It should be understood that the labels of system ground and guarded ground in the above examples are merely conventional labels to describe the different domains for guarded operation, and in some examples, the two power domains can be implemented differently. FIG. 8 illustrates another exemplary guard and power management integrated circuit according to examples of the disclosure. FIG. 8 includes guard and power management integrated circuit 800 that can be partially referenced to the system ground (e.g., corresponding to the ground of battery 801) and partially referenced to guard ground. Like FIG. 4A, the guard and power management integrated circuit 800 can include a supply capacitor 804 and one or more regulators 806 (e.g., similar to the multiple regulators in FIG. 4B) to implement bootstrapped power supplies for the touch and display circuit and the touch screen (e.g., corresponding to touch and display circuit 212 and touch screen 204). Guard and power management integrated circuit 800 can also include a switch SW2 (or alternatively a diode D1) to couple the battery 801 to the supply capacitor 804 in non-guarded operation (or guard low phase) to restore the charge of supply capacitor 804, and to decouple the battery 801 from the supply capacitor 804 during guarded operation (e.g., opening switch SW2 when the guard output voltage is greater than a threshold or in the guard high phase). However, rather than implementing the guard buffer referenced to system ground as illustrated in FIG. 4A or 4C, for example, in FIG. 8 guard buffer 802 can be implemented referenced to the guard ground. During non-guarded operation, SW1 can be closed and guard ground and system ground can be coupled together (and regulators 806 can be powered from battery 801). During guarded operation, SW1 can be opened, and guard buffer 802 can generate a guard signal to drive the system ground relative to the guard ground (and regulators 806 can be powered from supply capacitor 804). Guard buffer 802 can use a supply capacitor driven regulator output to generate the guard signal. For example, guard and power management integrated circuit 800 can also include a step-up direct current to direct current (DCDC) converter 810 which can generate a 10-15V output from a 3.6V battery powered supply capacitor 804.

Figure 9:
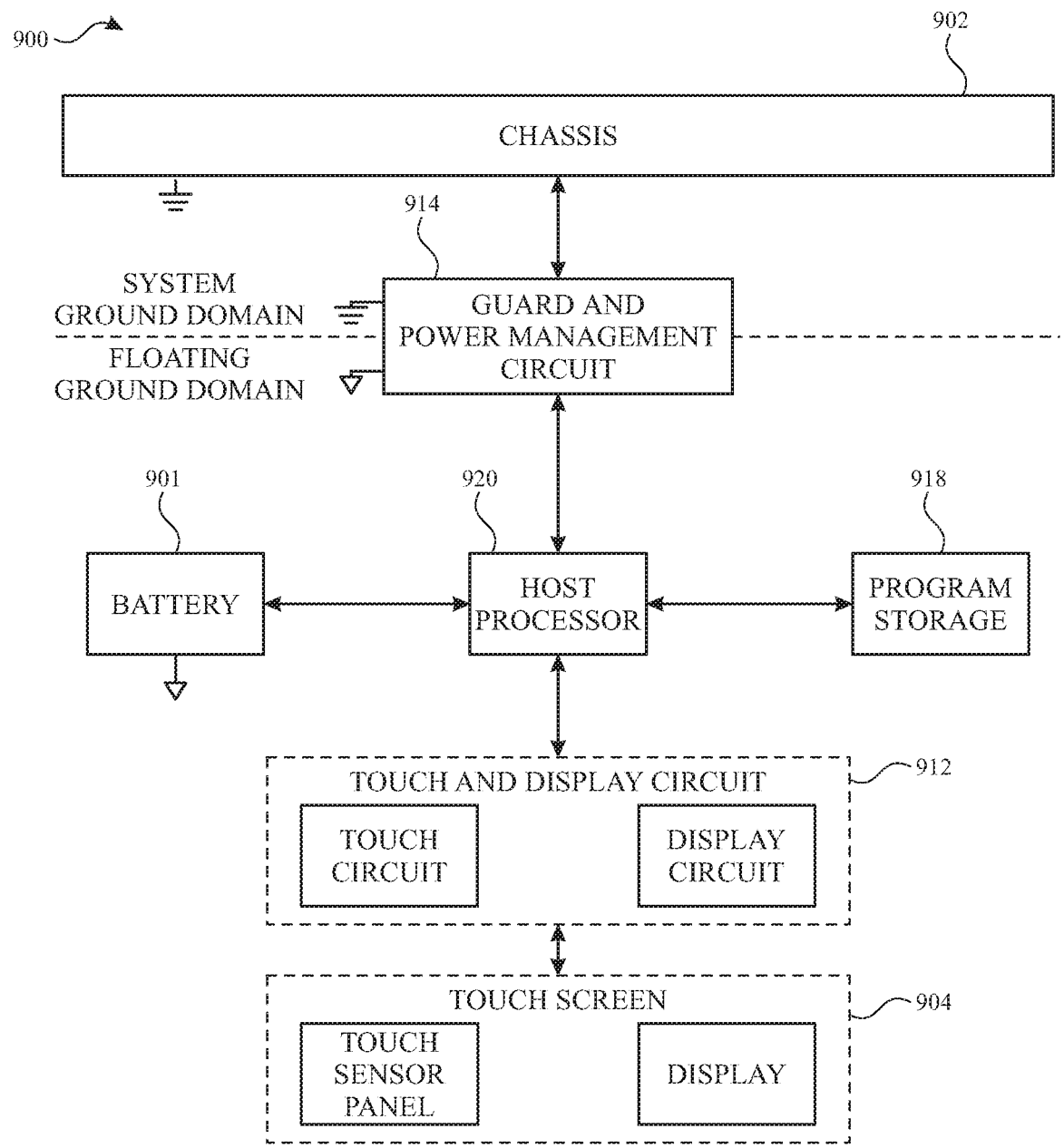
FIG. 9 illustrates a block diagram of an exemplary computing system that illustrates another implementation of an exemplary touch screen and exemplary touch and display integrated circuit operable in multiple power domains according to examples of the disclosure.

In the above examples (e.g., as illustrated in FIG. 2A), the guard and power management integrated circuit (e.g., guard and power management circuit 214) can divide the system ground domain from the floating ground domain (guarded ground domain). As illustrated above, the guard and power management integrated circuit (e.g., guard and power management integrated circuit 400 or guard and power management integrated circuit 800) can include a guard buffer to drive a potential difference between the system ground and guard ground. In some examples, the two power domains can be implemented differently. For example, as will be described below, in some examples, the two power domains can be implemented between the chassis of the device and the ground of the battery. In FIG. 2A, for example, battery 201 and the chassis of the device (not shown) can be coupled together. In FIG. 9, however, the chassis of the device and the battery can be in different domains.

FIG. 9 illustrates a block diagram of an exemplary computing system that illustrates another implementation of an exemplary touch screen and exemplary touch and display integrated circuit operable in multiple power domains according to examples of the disclosure. Exemplary computing system 900 can include touch screen 904 (e.g., corresponding to touch screen 204) and touch and display integrated circuit 912 (e.g., corresponding to touch and display integrated circuit 212). Like computing system 200 in FIG. 2A, computing system 900 can include a power supply, such as battery 901 (e.g., corresponding to battery 201), host processor 920 (e.g., corresponding to host processor 220), and program storage 918 (e.g., corresponding to program storage 218). These similar components in computing system 900 and computing system 200 can have similar functions that are not repeated here for brevity.

Computing system 900 also illustrates the chassis 902 of a device. Unlike in FIG. 2A, in which battery 201 and the chassis of the device (not shown) are coupled together (same power domain), in FIG. 9, battery 901 and chassis 902 of the device can be operated in different power domains. As described below, in guarded operation, battery 901, host processor 920, program storage 918, touch and display integrated circuit 912 and touch screen 904 can operate with reference to a guard ground different from the system ground represented by chassis 902. In non-guarded operation, 902 chassis and the remaining components of computing system 900 can operate in the same power domain referenced to the same system ground (chassis ground).

Computing system 900 can also include a guard and power management integrated circuit 914. Guard and power management integrated circuit 914 can be used to operate battery 901, host processor 920, program storage 918, touch and display integrated circuit 912 and touch screen 904 in a guarded power domain (different from the system power domain of chassis 902) during guarded touch operations, and operate the above circuitry in the system power domain (the same as the system power domain of chassis 902) otherwise (e.g., during non-guarded touch operations or during display operations). Guard and power management integrated circuit 914 can generate a guard voltage and can provide the voltages necessary for operating the chassis in a different power domain from the remaining circuitry of computing system 900. Although described as a guard and power management integrated circuit, it should be understood that guard and power management integrated circuit 914 can represent guard circuitry and/or power management circuitry. Also, it should be understood that additional power management circuitry may be included in computer system 900. For example, power management circuitry can be included to generate power supplies for touch and display integrated circuit 912 and touch screen 902 from battery 901.

Similar to the configuration of FIG. 2A, the configuration of FIG. 9 can provide for guarded operation (using multiple power domains). However, unlike in FIG. 2A where the touch and display integrated circuit 212 and touch screen 204 operate from a bootstrapped supply (e.g., from supply capacitor 404), touch and display integrated circuit 912 and touch screen 904 can operate from battery 901 (e.g., the main power supply for the device) rather than via a bootstrapped supply. Operating from battery 901 can provide more design flexibility because the bootstrapped supplies remain connected to battery 901, and therefore do not need to be recharged (e.g., as illustrated and described with reference to FIG. 3B or FIG. 5B). In other words, guarded operation can be decoupled from requirements to maintain the voltage on a supply capacitor of a bootstrapped supply for touch and display operation. Additionally, in the configuration of FIG. 9, the host processor 920 and touch and display integrated circuit 912 can be in the same power domain during guarded and non-guarded operation. As a result, the data transfers between host processor 920 and touch and display integrated circuit 912 can be simplified (i.e., without requiring switches or level shifters as described with respect to FIGS. 6A-6B).

Figure 10:
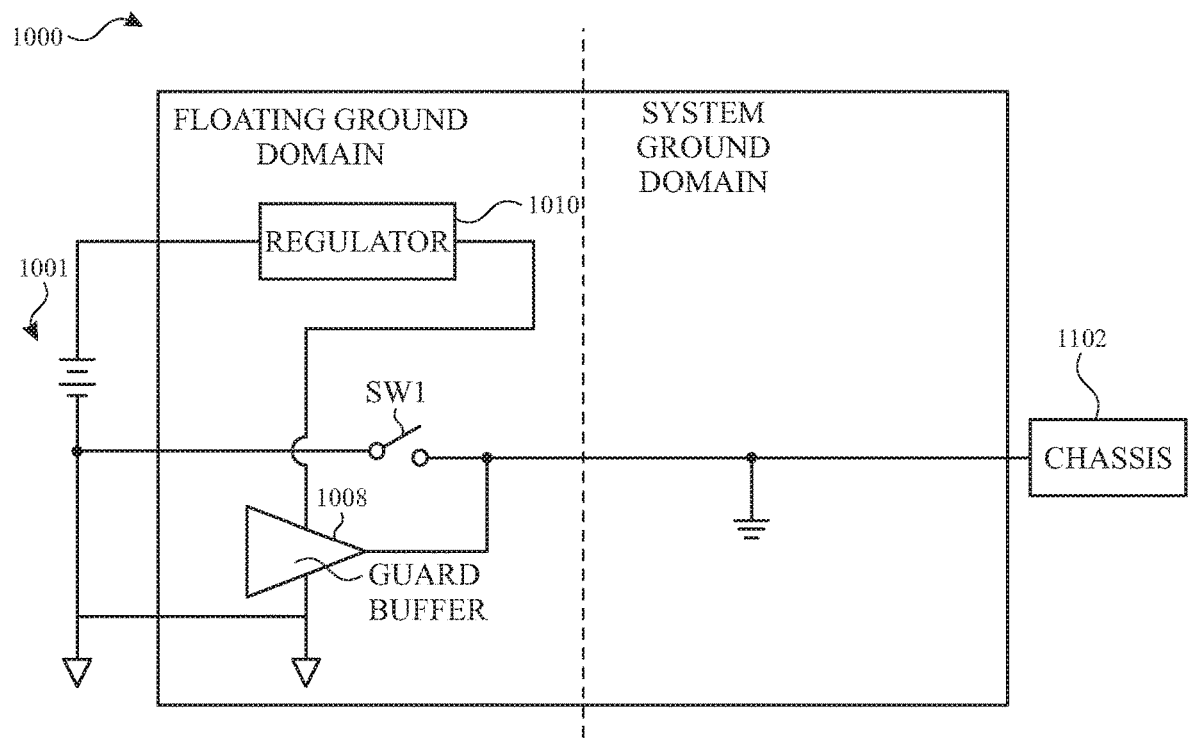
FIGS. 10 and 11 illustrate exemplary guard and power management integrated circuits according to examples of the disclosure.
Figure 11:
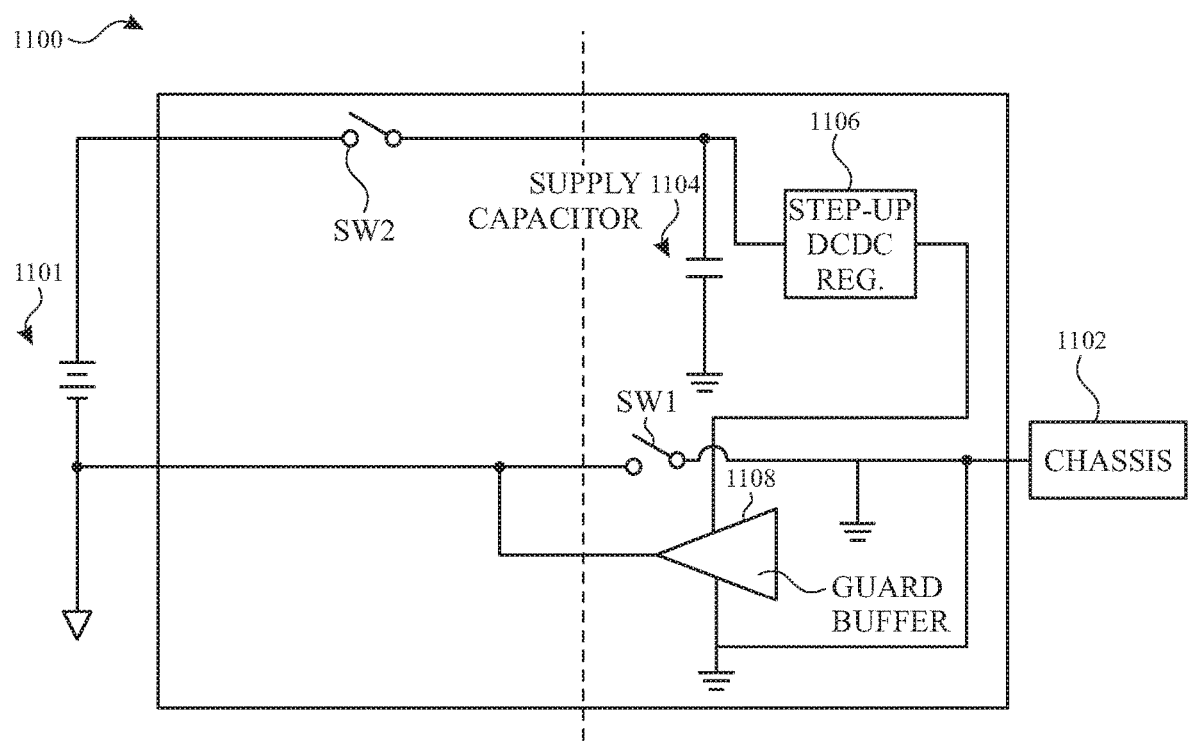

FIGS. 10 and 11 illustrate exemplary guard and power management integrated circuits according to examples of the disclosure. Guard and power management integrated circuit 1000 of FIG. 10 can be configured to drive the chassis of the device to provide different power domains. Guard and power management integrated circuit 1100 of FIG. 11 can be configured to drive the battery ground to provide different power domains. In either case, the guard signal (e.g., an alternating current) modulation between the chassis ground and battery ground can enable measurement of self-capacitance at touch electrodes of the touch sensor panel or touch screen.

Referring to FIG. 10, guard and power management integrated circuit 1000 can include a guard buffer 1008 referenced to battery ground and configured to generate a guard signal (e.g., a square or trapezoid wave with a high voltage at Vguard and a low voltage at battery ground) at its output. The output of guard buffer 1008 can be the system ground which can be coupled to chassis 1002. In some examples, guard and power management integrated circuit 1000 can include a voltage regulator 1010 configured to provide a supply voltage to guard buffer 1008. In some examples, the voltage supply can come directly from battery 1001 or from a regulator not included in guard and power management integrated circuit 1000. During non-guarded operation, the ground of battery 1001 can be coupled via switch SW1 (in the closed state) to chassis ground. During guarded operation, the ground of battery 1001 can be isolated via switch SW1 (in the opened state) from the chassis ground. Instead, the chassis ground can be driven by guard buffer 1008 referenced to the ground of battery 1001.

Referring to FIG. 11, guard and power management integrated circuit 1100 can include a guard buffer 1108 referenced to chassis ground (coupled to chassis 1102) and configured to generate a guard signal (e.g., a square or trapezoid wave with a high voltage at Vguard and a low voltage at chassis ground) at its output. The output of guard buffer 1108 can be the battery ground (coupled to the ground of battery 1101). Guard and power management integrated circuit 1100 can include a supply capacitor 1104 and a voltage regulator 1106 (e.g., a DCDC converter). In some examples, voltage regulator 1106 can be configured to provide a supply voltage to guard buffer 1108. During non-guarded operation, ground of battery 1101 can be coupled via switch SW1 (in the closed state) to chassis ground. During guarded operation, ground of battery 1101 can be isolated via switch SW1 (in the opened state) from the chassis ground. Instead, the ground of battery 1101 can be driven by guard buffer 1108 referenced to ground of chassis 1102.

As illustrated in FIG. 11, in some examples, guard and power management integrated circuit 1100 can include a bootstrapped supply (e.g., power supplied from supply capacitor 1104 rather than battery 1101 during guarded operation). The supply capacitor of the bootstrapped supply can be recharged from battery 1101 via switch SW2 (or a diode D1) while switch SW2 is closed (during non-guarded operation or during the guard low phase of guarded operation). In some examples, voltage regulator 1106 can be powered down during non-guarded operation. During guarded operation (e.g., guard high phase), switch SW2 can be opened and the guard voltage can be generated using supply capacitor 1104.

In some examples, the output of the guard buffer according to the examples herein can be measured. For example, the current driven by the guard buffer can be measured. The measured output of the guard buffer can be used, for example, to detect contact between a user and the device chassis and/or to compensate touch measurements to normalize touch values (e.g., based on the quality of coupling between a user and the device chassis). For example, the chassis to earth ground capacitance can depend on the level of grounding of the chassis. This chassis to earth ground capacitance can be derived, for example, based on the guard driven current. The chassis to earth ground capacitance can be greater when the user contacts the chassis (good grounding condition) than when the device chassis is not contacted by the user (poor grounding condition). Additionally, the measured capacitance associated with each finger in contact with a touch screen can depend on the number of fingers in contact with the touch screen. For example, as the number of fingers in contact with the touch screen increases, the measured capacitance can decrease. By measuring the guard buffer output current, for example, the chassis capacitance can be derived and used to compensate the touch measurements.

Figure 12A:
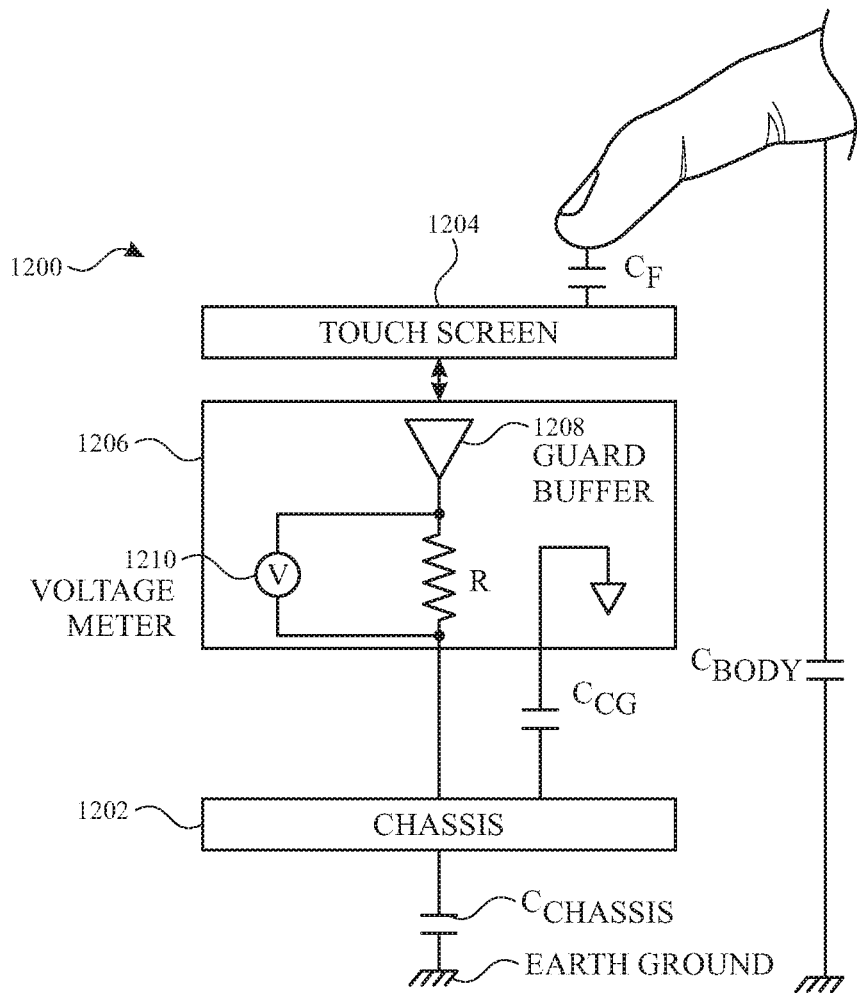
FIGS. 12A-12C illustrate an exemplary block diagram including a measurement circuit for a guard buffer and corresponding equivalent circuit representations according to examples of the disclosure.
Figure 12B:
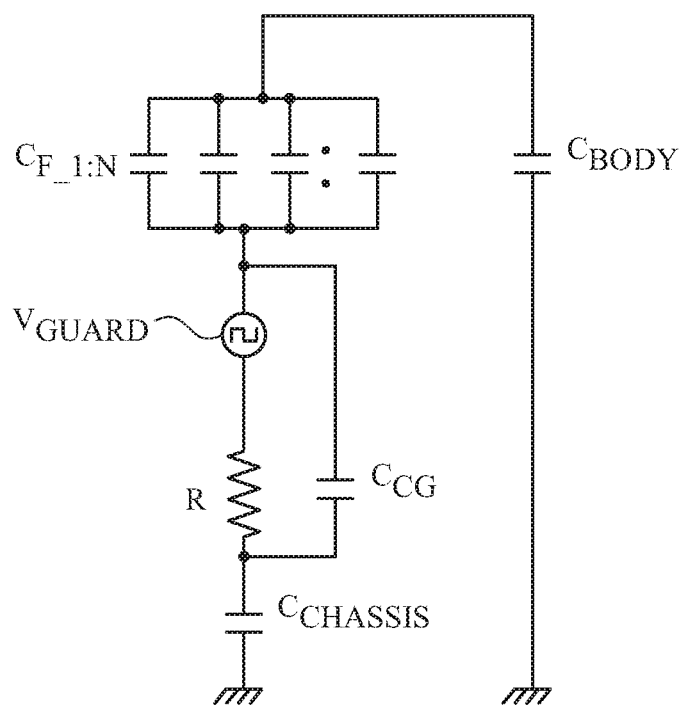
Figure 12C:
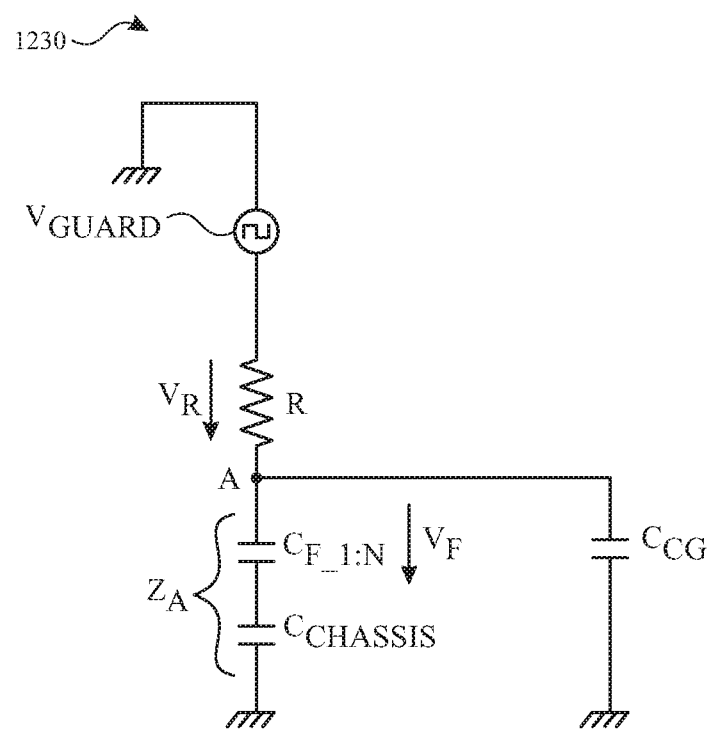

FIGS. 12A-12C illustrate an exemplary block diagram 1200 including a measurement circuit for a guard buffer and corresponding equivalent circuit representations according to examples of the disclosure. Block diagram 1200 includes a chassis (e.g., corresponding to chassis 902), touch screen 1204 (e.g., corresponding to touch screen 904), and guard integrated circuit 1206. Although not shown, block diagram 1200 can include additional circuitry as shown in FIG. 9, that is omitted here for simplicity. Guard integrated circuit 1206 include guard buffer 1208 (e.g., corresponding to guard buffer 1008) configured to drive the chassis during guarded operation (e.g., corresponding to the guard and power management integrated circuit 1000 of FIG. 10), and a measurement circuit configured to measure the output of guard buffer 1208. For example, the measurement circuit can include an impedance, such as resistor R, coupled between guard buffer 1208 and chassis 1202, and a measurement circuit 1210 configured to measure the voltage across resistor R. It should be understood that during non-guarded operation, resistor R may be bypassed and/or measurement circuit 1210 may be inactive (as the guard buffer may not driving during guarded operation). It should also be understood that although resistor R is shown to represent the impedance, that one or more different circuit elements (e.g., resistors, capacitors, inductors, transistors, etc.) can be used to implement the impedance. Although block diagram 1200 generally corresponds to the configuration of FIGS. 9 and 10, it should be understood that the measurement of the guard signal (and the associated measurement circuitry) can be used, in some examples, irrespective of where in the system the guard buffer and its associated measurement circuitry are disposed (e.g., such as the placement of the guard buffer in FIGS. 4A, 8, 11). FIG. 12A also shows a capacitance may exist between the chassis and earth ground ($C_{chassis}$), a capacitance may exist between a user's finger and earth ground ($C_{body}$), and a capacitance may exist between guard ground of guard integrated circuit and the chassis ($C_{GC}$).

FIG. 12B illustrates an equivalent circuit 1220 approximating the relevant aspects of the circuit of FIG. 12A. In particular, capacitors $C_{F\_1}$ to $C_{F\_N}$ can represent capacitances of objects, such as fingers, in contact with (or proximate to) touch screen 1204, which can be derived from the raw touch image based on the relative magnitudes of the touches (as measured during a self-capacitance touch sensing operation) and based on the known self-capacitance properties of the touch electrodes. The self-capacitance properties of the touch electrodes can be measured during factory calibration, for example, and stored with other touch calibration data in non-volatile memory (e.g., part of the touch subsystem or of the host device). Resistor R, capacitance $C_{chassis}$, and capacitance $C_{GC}$ can correspond to the resistor R, capacitance $C_{chassis}$, and capacitance $C_{GC}$ of FIG. 12A, respectively.

FIG. 12C illustrates equivalent circuit 1230 representing a simplified version of equivalent circuit 1220 shown in FIG. 12B. The simplification can be based on the assumption that $C_{body} \gg C_F$ (the sum of $C_{F\_1}$ to $C_{F\_N}$) and that $C_{body} \gg C_{chassis}$. As a result, the total capacitance can be dominated by the series combination of $C_{chassis}$ and $C_F$. By measuring voltage across resistor R ($V_R$), impedance $Z_A$ and capacitance $C_{chassis}$ can be computed. For example, the impedance to ground at the node labeled A in FIG. 12C can be computed using equation (1):

$$Z_A = \frac{1}{\frac{1}{Z_F + Z_{chassis}} + \frac{1}{Z_{CG}}} \quad (1)$$

which, solving for $Z_{chassis}$, can be rewritten as equation (2):

$$Z_{chassis} = \frac{1}{\frac{1}{Z_A} - \frac{1}{Z_{CG}}} - Z_F \quad (2)$$

where $Z_F$ can represent the total finger impedance, $Z_{chassis}$ can represent the chassis impedance, and $Z_{CG}$ can represent the guard ground to chassis impedance.

The impedance to ground at the node labeled A in FIG. 12C can also be computed by measuring the complex voltage $V_R$ as shown in equation (3):

$$Z_A = \frac{V_{guard} + V_R}{I_R} \quad (3)$$

where $V_R$ can represent the complex voltage across resistor R, $V_{guard}$ can represent the complex guard driver output voltage, and $I_R$ can represent the complex current into node A (defined by ohm's law as $I_R = V_R/R$).

Substituting $I_R$ in equation (3) and substituting equation (3) into equation (2), $Z_{chassis}$ can be computed as shown in equation (4):

$$Z_{chassis} = \frac{1}{\frac{V_R}{R \cdot (V_{guard} + V_R)} - \frac{1}{Z_{CG}}} - Z_F \quad (4)$$

A scaling factor ($S_F$) can be derived, which can be used to scale the touch magnitude in the ungrounded case (e.g., when the user not in contact with the chassis) so as to restore the touch magnitude to the touch magnitude that would be expected for the grounded case (e.g., when the user is in contact with the chassis). In some examples, the scaling factor can be computed based on a computed voltage $V_F$ across the sum of capacitors $C_{F\_1}$ to $C_{F\_N}$ under the grounded condition ($V_{F\_grounded}$) with $C_{chassis}$ shorted to earth ground and based on a computed voltage $V_F$ across the sum of capacitors $C_{F\_1}$ to $C_{F\_N}$ under the ungrounded condition ($V_{F\_ungrounded}$) without $C_{chassis}$ shorted to earth ground. The scaling factor can be computed as shown in equation (5):

$$S_F = \frac{V_{F\_grounded}}{V_{F\_ungrounded}} \quad (5)$$

Thus, using the scaling factor, the finger capacitances measured in the ungrounded condition can be scaled by multiplying the ungrounded measurements times the scaling factor. In some examples, multiple scaling factors can be computed based on different amounts of grounding (e.g., as estimated based on $C_{chassis}$) and the scaling factor applied to the touch measurements can be a function of the grounding.

As described above, the chassis capacitance can be indicative of a grounding condition. For example, the processing circuit can be programmed to estimate a chassis capacitance (e.g., capacitance between a chassis and earth ground) based on the guard signal measured by the measurement circuit (e.g., as explained in equation (4)). The processing circuitry can be further programmed to predict contact between a touch object and a chassis based on the chassis capacitance (e.g., when the chassis capacitance is less than a threshold capacitance). The processing circuitry can also be further programmed to estimate a chassis capacitance based on the total capacitance of detected contact objects measured at the touch sensor panel from touch operations. The chassis capacitance can be estimated based on a voltage divider of the guard signal at node A as described above.

Additionally, the chassis capacitance can be used to compensate touch measurements (touch signals) using the scaling factor. In some examples, the chassis capacitance can be used to determine whether the touch measurements corresponding to multiple fingers may be attenuated (e.g., due to increased impedance of $C_F$) and apply a compensation to normalize the touch measurements for such attenuation. For example, the processing circuitry can be further programmed to compensate the touch signals based on a number of detected contact objects on the touch screen. In accordance with a first number of detected contact objects, each of the touch signals can be compensated by a first amount. In accordance with a second number of detected contact objects on the touch screen greater than the first number of detected contact objects, each of the touch signals can be compensated by a second amount greater than the first amount. The first and second amounts can be determined based on the estimated chassis capacitance, such that the compensation may not require determining a number of detected objects. Instead, the chassis capacitance can vary as a function of the number of contact objects due to the voltage divider and the change in total capacitances $C_F$ corresponding to $C_{F\_1}$ to $C_{F\_N}$.

Figure 13:
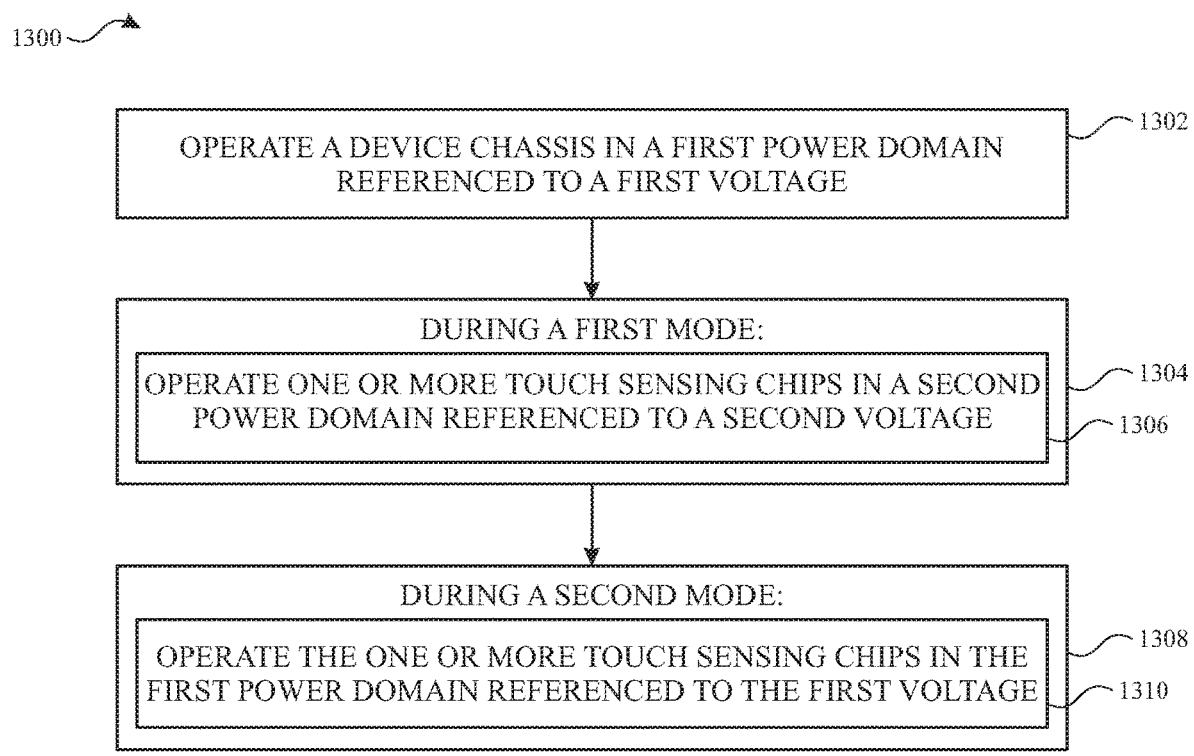
FIG. 13 illustrates an exemplary process for operating touch and display circuitry operable in multiple power domains according to examples of the disclosure.

FIG. 13 illustrates an exemplary process 1300 for operating touch and display circuitry operable in multiple power domains according to examples of the disclosure. Process 1300 can include operating (1302) a device chassis (e.g., a conductive housing of a device such as mobile telephone 136, digital media player 140, personal computer 144, tablet computer 148, wearable device 150, etc. in a first power domain referenced to a first voltage (e.g., chassis ground). In some examples, one or more touch sensing and/or display chips (e.g., touch and display integrated circuit 912, host processor 920, etc.) can operate in either the first power domain referenced to the first voltage (e.g., referenced to chassis ground) or a second power domain referenced to a second voltage (e.g., a guarded power domain referenced to guard ground).

In some examples, process 1300 includes, during a first mode (1304) (e.g., corresponding to guarded operation), operating (1306) the one or more touch sensing and/or display chips in the second power domain referenced to a second voltage (e.g., a guarded power domain referenced to guard ground). In some examples, the one or more touch sensing and/or display chips (e.g., including touch and display integrated circuit 912) can be configured to perform touch operations (e.g., a guarded self-capacitance scan) for a touch screen. The one or more touch sensing and/or display chips can be further configured to maintain display of an image displayed on the touch screen with reference to the second voltage (e.g., guard voltage) during the first mode (guarded operation for touch operations). In some examples, during the first mode (guarded operation for concurrent touch and display, for example), the one or more touch sensing and/or display chips can be further configured to perform display operations (e.g., display refresh) for the touch screen with reference to the second voltage (e.g., guard voltage). In some examples, process 1300 includes, during a second mode (1308) (e.g., corresponding to non-guarded operation), operating the one or more touch sensing and/or display chips (e.g., touch and display integrated circuit 912, host processor 920, etc.) in the first power domain referenced to the first voltage (e.g. with reference to chassis ground). The one or more touch sensing and/or display chips can be configured to perform display operations (e.g., display refresh and/or maintaining the display for the touch screen, in some examples.

Therefore, according to the above, some examples of the disclosure are directed to a touch sensing system comprising a first chip and a second chip, different than the first chip. The first chip can be configured to operate in a first power domain referenced to a first voltage and can be configured to generate a second voltage. The second chip can be configured to perform touch operations and display operations for a touch screen. The second chip can be configured to operate, during a first mode, in a second power domain, different from the first power domain, referenced to the second voltage. The second chip can be configured to operate, during a second mode, in the first power domain referenced to the first voltage. Additionally or alternatively to one or more of the examples disclosed above, in some examples, the first power domain can be referenced to a system ground of an electronic device in which the touch sensing system is included. Additionally or alternatively to one or more of the examples disclosed above, in some examples, the second voltage can comprise an AC voltage. Additionally or alternatively to one or more of the examples disclosed above, in some examples, the second chip can be disposed on ground plane coupled to the first chip and configured to be driven with the second voltage. Additionally or alternatively to one or more of the examples disclosed above, in some examples, the second chip can comprise: touch sensing circuitry configured to sense touch at the one or more touch electrodes of the touch screen using the second voltage as a stimulation signal; and display circuitry configured to update or maintain an image displayed on the touch screen. Additionally or alternatively to one or more of the examples disclosed above, in some examples, the first chip can comprise one or more supply capacitors and one or more voltage regulators. During the first mode, while the second voltage is in a first state, the one or more supply capacitors can be configured to power the one or more voltage regulators and the one or more voltage regulators can be configured to generate one or more output voltages referenced to the second voltage. During the second mode, while the second voltage can be in a second state, different from the first state, the one or more voltage regulators can be configured to generate one or more output voltages referenced to the first voltage. Additionally or alternatively to one or more of the examples disclosed above, in some examples, the second voltage can be in the first state when the second voltage is in a high voltage state, and the second voltage can be in the second state when the second voltage is in a low voltage state. Additionally or alternatively to one or more of the examples disclosed above, in some examples, the second chip can be coupled to receive the one or more output voltages referenced to the first or the second voltage and perform touch and display operations with reference to the one or more output voltages. Additionally or alternatively to one or more of the examples disclosed above, in some examples, the electronic device can further comprise a third chip operating in the first power domain. The third chip can be communicatively coupled by a communication link to the second chip via the first chip. Additionally or alternatively to one or more of the examples disclosed above, in some examples, the first chip can comprise one or more level shifters configured to adjust a voltage level of data on the communication link between the first power domain to the second power domain. Additionally or alternatively to one or more of the examples disclosed above, in some examples, the first chip can comprise one or more bypass switches configured to bypass the one or more level shifters without adjusting the voltage level of data on the communication link during the second mode while the first chip and the second chip operate in the first power domain. Additionally or alternatively to one or more of the examples disclosed above, in some examples, the first chip can comprise sensing circuitry configured to decouple the communication link between the second chip and the third chip during the first mode, and couple the communication link between the second chip and the third chip during the second mode.

Some examples of the disclosure are directed to an electronic device comprising a touch screen, a first chip and a second chip, different than the first chip. The first chip can be configured to operate in a first power domain referenced to a first voltage. The first chip can be configured to generate a second voltage. The second chip can be configured to perform touch operations and display operations for the touch screen. The second chip can be configured to operate during a first mode, in a second power domain, different from the first power domain, referenced to the second voltage, and operate during a second mode, in the first power domain referenced to the first voltage. Additionally or alternatively to one or more of the examples disclosed above, in some examples, the first power domain can be referenced to a system ground of an electronic device in which the touch sensing system is included. Additionally or alternatively to one or more of the examples disclosed above, in some examples, the second voltage can comprise an AC voltage. Additionally or alternatively to one or more of the examples disclosed above, in some examples, the second chip can be disposed on ground plane coupled to the first chip and configured to be driven with the second voltage. Additionally or alternatively to one or more of the examples disclosed above, in some examples, the second chip can comprise: touch sensing circuitry configured to sense touch at the one or more touch electrodes of the touch screen using the second voltage as a stimulation signal; and display circuitry configured to update or maintain an image displayed on the touch screen. Additionally or alternatively to one or more of the examples disclosed above, in some examples, the first chip can comprise one or more supply capacitors and one or more voltage regulators. During the first mode, while the second voltage is in a first state, the one or more supply capacitors can be configured to power the one or more voltage regulators and the one or more voltage regulators can be configured to generate one or more output voltages referenced to the second voltage. During the second mode, while the second voltage can be in a second state, different from the first state, the one or more voltage regulators can be configured to generate one or more output voltages referenced to the first voltage. Additionally or alternatively to one or more of the examples disclosed above, in some examples, the second voltage can be in the first state when the second voltage is in a high voltage state, and the second voltage can be in the second state when the second voltage is in a low voltage state. Additionally or alternatively to one or more of the examples disclosed above, in some examples, the second chip can be coupled to receive the one or more output voltages referenced to the first or the second voltage and perform touch and display operations with reference to the one or more output voltages. Additionally or alternatively to one or more of the examples disclosed above, in some examples, the electronic device can further comprise a third chip operating in the first power domain. The third chip can be communicatively coupled by a communication link to the second chip via the first chip. Additionally or alternatively to one or more of the examples disclosed above, in some examples, the first chip can comprise one or more level shifters configured to adjust a voltage level of data on the communication link between the first power domain to the second power domain. Additionally or alternatively to one or more of the examples disclosed above, in some examples, the first chip can comprise one or more bypass switches configured to bypass the one or more level shifters without adjusting the voltage level of data on the communication link during the second mode while the first chip and the second chip operate in the first power domain. Additionally or alternatively to one or more of the examples disclosed above, in some examples, the first chip can comprise sensing circuitry configured to decouple the communication link between the second chip and the third chip during the first mode, and couple the communication link between the second chip and the third chip during the second mode.

Some examples of the disclosure are directed to a method. The method can comprise: operating a first chip in a first power domain referenced to a first voltage; during a first mode: operating a second chip, different than the first chip, in a second power domain, different from the first power domain, referenced to a second voltage; and during a second mode: operating the second chip in the first power domain referenced to the first voltage. The first chip can be configured to generate a second voltage. The second chip can be configured to perform touch operations for a touch screen during the first mode. The second chip can be configured to perform display operations for the touch screen during the second mode. Additionally or alternatively to one or more of the examples disclosed above, in some examples, during the first mode, the second chip can be further configured to maintain display of an image displayed on the touch screen with reference to the second voltage. Additionally or alternatively to one or more of the examples disclosed above, in some examples, during the first mode: the second chip can be further configured to perform display operations (e.g., display refresh) for the touch screen with reference to the second voltage. Additionally or alternatively to one or more of the examples disclosed above, in some examples, the method can further comprise during the first mode: decoupling a data communication link between the second chip operating in the second power domain and a third chip operating in the first power domain; and during the second mode: coupling the data communication link between the second chip operating in the first power domain and the third chip in the first power domain. Additionally or alternatively to one or more of the examples disclosed above, in some examples, the method can further comprise during the first mode: adjusting a voltage of data on a data communication link between the second chip operating in the second power domain and a third chip operating in the first power domain; and during the second mode: forgo adjusting the voltage of the data on the data communication link between the second chip operating in the first power domain and the third chip in the first power domain. Some examples of the disclosure are directed to a non-transitory computer-readable medium. The non-transitory computer readable storage medium can store instructions, which when executed by one or more processors, can cause the one or more processors to perform any of the above methods.

Some examples of the disclosure are directed to a touch sensing system. The touch sensing system can comprise a chassis; one or more chips configured to perform touch operations and display operations for a touch screen; and a guard buffer configured to generate a guard signal. During a first mode of operation, the chassis and a ground reference of the one or more chips can be coupled via the guard buffer, such that a voltage of the chassis and a voltage of the ground reference of the one or more chips can be differentiated by the guard signal. During a second mode of operation, the chassis and the ground reference of the one or more chips can be coupled together such that the voltage of the chassis can be the same as the voltage of the ground reference of the one or more chips. Additionally or alternatively to one or more of the examples disclosed above, in some examples, the one or more chips can comprise touch sensing circuitry configured to sense touch at one or more touch electrodes of the touch screen using the guard signal as a stimulation signal, display circuitry configured to update or maintain an image displayed on the touch screen, and a host processor. Additionally or alternatively to one or more of the examples disclosed above, in some examples, the touch sensing system can further comprise a battery. The ground reference of the one or more chips can be the same as a ground reference of the battery. Additionally or alternatively to one or more of the examples disclosed above, in some examples, the guard signal can comprise an AC voltage. Additionally or alternatively to one or more of the examples disclosed above, in some examples, the guard buffer can be referenced to the ground reference of the one or more chips and an output of the guard buffer can be coupled to drive the chassis. Additionally or alternatively to one or more of the examples disclosed above, in some examples, the guard buffer can be referenced to the chassis and an output of the guard buffer can be coupled to drive the ground reference of the one or more chips. Additionally or alternatively to one or more of the examples disclosed above, in some examples, the touch sensing system can further comprise a supply capacitor. During the first mode, while the guard signal can be in a first state, the supply capacitor can be configured to supply a supply voltage referenced to the chassis to the guard buffer.

Some examples of the disclosure are directed to a method. The method can comprise: during a first mode: coupling, via a guard buffer, a chassis and a ground reference of one or more chips configured to perform touch operations and display operations, such that a voltage of the chassis and a voltage of the ground reference of the one or more chips can be differentiated by a guard signal generated by the guard buffer; and during a second mode: coupling the chassis and the ground reference of the one or more chips such that the voltage of the chassis can be the same as the voltage of the ground reference of the one or more chips. Additionally or alternatively to one or more of the examples disclosed above, in some examples, during the first mode: the one or more chips can be configured to maintain display of an image displayed on the touch screen or update the image displayed on the touch screen with reference to the voltage of the ground reference of the one or more chips that can be different from the voltage of the chassis; and during the second mode: the one or more chips can be configured to maintain display of the image display on the touch screen or update the image displayed on the touch screen with reference to voltage of the ground reference of the one or more chips that can be the same as the voltage of the chassis. Additionally or alternatively to one or more of the examples disclosed above, in some examples, the guard buffer can be referenced to the chassis and an output of the guard buffer can be coupled to drive the ground reference of the one or more chips during the first mode. Additionally or alternatively to one or more of the examples disclosed above, in some examples, the guard buffer can be referenced to the ground reference of the one or more chips and an output of the guard buffer can be coupled to drive the chassis. Additionally or alternatively to one or more of the examples disclosed above, in some examples, the method can further comprise: during the first mode: while the guard signal is in a first state, a supply capacitor can be configured to supply a supply voltage referenced to the chassis to the guard buffer. Some examples of the disclosure are directed to a non-transitory computer-readable medium. The non-transitory computer readable storage medium can store instructions, which when executed by one or more processors, can cause the one or more processors to perform any of the above methods.

Some examples of the disclosure are directed to a touch sensing system. The touch sensing system can comprise: a battery; one or more chips configured to perform touch operations and display operations for a touch screen; and a guard buffer configured to generate a guard signal. During a first mode of operation, a ground reference of the battery and a ground reference of the one or more chips can be coupled via the guard buffer, such that a voltage of the ground reference of the battery and a voltage of the ground reference of the one or more chips can be differentiated by the guard signal. During a second mode of operation, the ground reference of the battery and the ground reference of the one or more chips can be coupled together such that the voltage of the ground reference of the battery can be the same as the voltage of the ground reference of the one or more chips. Additionally or alternatively to one or more of the examples disclosed above, in some examples, the one or more chips can comprise touch sensing circuitry configured to sense touch at one or more touch electrodes of the touch screen using the guard signal as a stimulation signal and display circuitry configured to update or maintain an image displayed on the touch screen. Additionally or alternatively to one or more of the examples disclosed above, in some examples, the guard signal can comprises an AC voltage. Additionally or alternatively to one or more of the examples disclosed above, in some examples, the one or more chips can be disposed on ground plane configured to be driven with the guard signal. Additionally or alternatively to one or more of the examples disclosed above, in some examples, the touch sensing system can further comprising: one or more supply capacitors; and one or more voltage regulators. During the first mode, while the guard signal can be in a first state, the one or more supply capacitors can be configured to power the one or more voltage regulators and the one or more voltage regulators can be configured to generate one or more output voltages referenced to the guard signal. During the second mode, while the guard signal can be in a second state, different from the first state, the one or more voltage regulators can be configured to generate one or more output voltages referenced to the ground reference of the battery. Additionally or alternatively to one or more of the examples disclosed above, in some examples, the guard signal can be in the first state when the guard signal is in a high voltage state, and the guard signal can be in the second state when the guard signal is in a low voltage state. Additionally or alternatively to one or more of the examples disclosed above, in some examples, the one or more chips can be coupled to receive the one or more output voltages referenced to the ground reference of the battery or the guard signal and perform touch and display operations with reference to the one or more output voltages. Additionally or alternatively to one or more of the examples disclosed above, in some examples, the touch sensing system can further comprise a processor configured to operate with reference to the ground reference of the battery. The processor can be communicatively coupled by a communication link to the one or more chips via one or more level shifters. The one or more level shifters can be configured to adjust a voltage level of data on the communication link between a first power domain referenced to the ground reference of the battery and a second power domain referenced to the guard signal. Additionally or alternatively to one or more of the examples disclosed above, in some examples, the touch sensing system can further comprise one or more bypass switches configured to bypass the one or more level shifters without adjusting the voltage level of data on the communication link during the second mode while the one or more chips operate in the first power domain. Additionally or alternatively to one or more of the examples disclosed above, in some examples, the touch sensing system can further comprise: a processor configured to operate with reference to the ground reference of the battery; and sensing circuitry configured to: decouple a communication link between the one or more chips and the processor during the first mode; and couple the communication link between the one or more chips and the processor during the second mode.

Some examples of the disclosure are directed to a method. The method can comprise: during a first mode: coupling, via a guard buffer, a ground reference of a battery and a ground reference of one or more chips configured to perform touch operations and display operations, such that a voltage of the ground reference of the battery and a voltage of the ground reference of the one or more chips can be differentiated by a guard signal generated by the guard buffer; and during a second mode: coupling the ground reference of the battery and the ground reference of the one or more chips such that the voltage of the chassis can be the same as the voltage of the ground reference of the one or more chips. Additionally or alternatively to one or more of the examples disclosed above, in some examples, the one or more chips can comprise touch sensing circuitry configured to sense touch at one or more touch electrodes of the touch screen using the guard signal as a stimulation signal and display circuitry configured to update or maintain an image displayed on the touch screen. Additionally or alternatively to one or more of the examples disclosed above, in some examples, during the first mode, while the guard signal can be in a first state, the one or more supply capacitors can be configured to power the one or more voltage regulators and the one or more voltage regulators can be configured to generate one or more output voltages referenced to the guard signal; and during the second mode, while the guard signal can be in a second state, different from the first state, the one or more voltage regulators can be configured to generate one or more output voltages referenced to the ground reference of the battery. Additionally or alternatively to one or more of the examples disclosed above, in some examples, the guard signal can be in the first state when the guard signal is in a high voltage state, and the guard signal can be in the second state when the guard signal is in a low voltage state. Additionally or alternatively to one or more of the examples disclosed above, in some examples, the one or more chips can be coupled to receive the one or more output voltages referenced to the ground reference of the battery or the guard signal and perform touch and display operations with reference to the one or more output voltages. Additionally or alternatively to one or more of the examples disclosed above, in some examples, the method can further comprise: coupling, via one or more level shifters configured to adjust a voltage level of data on a communication link between a first power domain referenced to the ground reference of the battery and a second power domain referenced to the guard signal, a processor configured to operate with reference to the ground reference of the battery and the one or more chips. Additionally or alternatively to one or more of the examples disclosed above, in some examples, the method further comprises: bypassing the one or more level shifters without adjusting the voltage level of data on the communication link during the second mode while the one or more chips operate in the first power domain. Additionally or alternatively to one or more of the examples disclosed above, in some examples, the method further comprises: coupling a communication link between the one or more chips and a processor configured to operate with reference to the ground reference of the battery during the second mode; and decoupling the communication link between the one or more chips and the processor during the first mode. Some examples of the disclosure are directed to a non-transitory computer-readable medium. The non-transitory computer readable storage medium can store instructions, which when executed by one or more processors, can cause the one or more processors to perform any of the above methods.

Some examples of the disclosure are directed to a touch sensing system. The touch sensing system can comprise: one or more touch sensing chips configured to perform touch operations for a touch sensor panel; a guard buffer configured to generate a guard signal; and a measurement circuit coupled to an output of the guard buffer and configured to measure the guard signal. Additionally or alternatively to one or more of the examples disclosed above, in some examples, the guard buffer can be coupled between a chassis and one of the one or more touch sensing chips. Additionally or alternatively to one or more of the examples disclosed above, in some examples, the measurement circuit can comprise a resistor coupled to the output of the guard buffer. Additionally or alternatively to one or more of the examples disclosed above, in some examples, the measurement circuit can be coupled to the resistor and can be configured to measure a current through the resistor or a voltage across the resistor. Additionally or alternatively to one or more of the examples disclosed above, in some examples, the measurement circuit can be configured to measure the current through the resistor or the voltage across the resistor during guarded operation without measuring the current through the resistor or the voltage across the resistor during non-guarded operation. Additionally or alternatively to one or more of the examples disclosed above, in some examples, the touch sensing system can further comprise a processor programmed to estimate a chassis capacitance based on the guard signal measured by the measurement circuit. Additionally or alternatively to one or more of the examples disclosed above, in some examples, the chassis capacitance can be the capacitance between a chassis and earth ground. Additionally or alternatively to one or more of the examples disclosed above, in some examples, the processor can be further programmed to predict contact between a touch object and a chassis based on the chassis capacitance. Additionally or alternatively to one or more of the examples disclosed above, in some examples, the processor can be further programmed to compensate touch signals of the touch operations based on the chassis capacitance. Additionally or alternatively to one or more of the examples disclosed above, in some examples, the processor can be further programmed to compensate the touch signals based further on a number of detected contact objects. Additionally or alternatively to one or more of the examples disclosed above, in some examples, in accordance with a first number of detected contact objects, each of the touch signals can be compensated by a first amount; and in accordance with a second number of detected contact objects greater than the first number of detected contact objects, each of the touch signals can be compensated by a second amount greater than the first amount. Additionally or alternatively to one or more of the examples disclosed above, in some examples, the processor can be further programmed to estimate a chassis capacitance based on the total capacitance of detected contact objects measured at the touch sensor panel from touch operations. Additionally or alternatively to one or more of the examples disclosed above, in some examples, the processor can be further programmed to estimate a chassis capacitance based on a voltage divider of the guard signal.

Some examples of the disclosure are directed to a method. The method can comprise: generating a guard signal; and measuring an output of the guard buffer. Additionally or alternatively to one or more of the examples disclosed above, in some examples, the guard buffer can be coupled between a chassis and one of one or more touch sensing chips configured to perform touch operations for a touch sensor panel. Additionally or alternatively to one or more of the examples disclosed above, in some examples, measuring the output of the guard buffer can comprise measuring a current through a resistor coupled to the output of the guard buffer or a voltage across the resistor. Additionally or alternatively to one or more of the examples disclosed above, in some examples, measuring the output of the guard buffer can occur during guarded operation without measuring the current through the resistor during non-guarded operation. Additionally or alternatively to one or more of the examples disclosed above, in some examples, the method can further comprise estimating a chassis capacitance based on the guard signal. Additionally or alternatively to one or more of the examples disclosed above, in some examples, the chassis capacitance can be the capacitance between a chassis and earth ground. Additionally or alternatively to one or more of the examples disclosed above, in some examples, the method can further comprise: predicting contact between a touch object and a chassis based on the chassis capacitance. Additionally or alternatively to one or more of the examples disclosed above, in some examples, the method can further comprise: compensating touch signals of the touch operations based on the chassis capacitance. Additionally or alternatively to one or more of the examples disclosed above, in some examples, the method can further comprise compensating the touch signals based further on a number of detected contact objects. Additionally or alternatively to one or more of the examples disclosed above, in some examples, in accordance with a first number of detected contact objects, each of the touch signals can be compensated by a first amount; and in accordance with a second number of detected contact objects greater than the first number of detected contact objects, each of the touch signals can be compensated by a second amount greater than the first amount. Additionally or alternatively to one or more of the examples disclosed above, in some examples, the method can further comprise estimating a chassis capacitance based on the total capacitance of detected contact objects measured at the touch sensor panel from touch operations. Additionally or alternatively to one or more of the examples disclosed above, in some examples, the method can further comprise estimating a chassis capacitance based on a voltage divider of the guard signal. Some examples of the disclosure are directed to a non-transitory computer-readable medium. The non-transitory computer readable storage medium can store instructions, which when executed by one or more processors, can cause the one or more processors to perform any of the above methods.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch sensing system comprising:
a first chip operating in a first power domain referenced to a first voltage, the first chip configured to generate a second voltage different than the first voltage and to generate one or more output voltages, the one or more output voltages referenced to the second voltage in a first mode and referenced to the first voltage in a second mode; and
a second chip, different than the first chip, configured to perform touch operations and display operations for a touch screen and configured to:
operate during the first mode, in a second power domain, different from the first power domain, referenced to the second voltage and using the one or more output voltages referenced to the second voltage; and
operate during the second mode, in the first power domain referenced to the first voltage and using the one or more output voltages referenced to the first voltage.

2. The touch sensing system of claim 1, wherein the first power domain is referenced to a system ground of an electronic device in which the touch sensing system is included.

3. The touch sensing system of claim 1, wherein the second voltage comprises an AC voltage.

4. The touch sensing system of claim 1, wherein the second chip is disposed on ground plane coupled to the first chip and configured to be driven with the second voltage.

5. The touch sensing system of claim 1, wherein the second chip comprises:
touch sensing circuitry configured to sense touch at one or more touch electrodes of the touch screen using the second voltage as a stimulation signal; and
display circuitry configured to update or maintain an image displayed on the touch screen.

6. The touch sensing system of claim 1, wherein the first chip comprises:
one or more supply capacitors; and
one or more voltage regulators;
wherein during the first mode, while the second voltage is in a first state, the one or more supply capacitors are configured to power the one or more voltage regulators and the one or more voltage regulators are configured to generate the one or more output voltages referenced to the second voltage, and
wherein during the second mode, while the second voltage is in a second state, different from the first state, the one or more voltage regulators are configured to generate the one or more output voltages referenced to the first voltage.

7. The touch sensing system of claim 6, wherein the second voltage is in the first state when the second voltage is in a high voltage state, and the second voltage is in the second state when the second voltage is in a low voltage state.

8. The touch sensing system of claim 6, wherein the second chip is coupled to receive the one or more output voltages referenced to the first or the second voltage and perform touch and display operations with reference to the one or more output voltages.

9. The touch sensing system of claim 1, further comprising:
a third chip operating in the first power domain, the third chip communicatively coupled by a communication link to the second chip via the first chip.

10. The touch sensing system of claim 9, wherein the first chip comprises:
one or more level shifters configured to adjust a voltage level of data on the communication link between the first power domain to the second power domain.

11. The touch sensing system of claim 10, wherein the first chip comprises:
one or more bypass switches configured to bypass the one or more level shifters without adjusting the voltage level of data on the communication link during the second mode while the first chip and the second chip operate in the first power domain.

12. The touch sensing system of claim 9, wherein the first chip comprises:
switching circuitry configured to:
decouple the communication link between the second chip and the third chip during the first mode; and
couple the communication link between the second chip and the third chip during the second mode.

13. An electronic device comprising:
a touch screen;
a first chip operating in a first power domain referenced to a first voltage, the first chip configured to generate a second voltage different than the first voltage and to generate one or more output voltages, the one or more output voltages referenced to the second voltage in a first mode and referenced to the first voltage in a second mode; and
a second chip, different than the first chip, configured to perform touch operations and display operations for the touch screen and configured to:
operate during the first mode, in a second power domain, different from the first power domain, referenced to the second voltage and using the one or more output voltages referenced to the second voltage; and
operate during the second mode, in the first power domain referenced to the first voltage and using the one or more output voltages referenced to the first voltage.

14. A method comprising:
operating a first chip in a first power domain referenced to a first voltage, the first chip configured to generate a second voltage different than the first voltage and to generate one or more output voltages, the one or more output voltages referenced to the second voltage in a first mode and referenced to the first voltage in a second mode;
during the first mode:
operating a second chip, different than the first chip, in a second power domain, different from the first power domain, referenced to the second voltage and using the one or more output voltages referenced to the second voltage, wherein the second chip is configured to perform touch operations for a touch screen; and
during the second mode:
operating the second chip in the first power domain referenced to the first voltage and using the one or more output voltages referenced to the first voltage, wherein the second chip is configured to perform display operations for the touch screen.

15. The method of claim 14, wherein:
during the first mode:
the second chip is further configured to maintain display of an image displayed on the touch screen with reference to the second voltage.

16. The method of claim 14, wherein:
during the first mode:
the second chip is further configured to perform display operations for the touch screen with reference to the second voltage.

17. The method of claim 14, further comprising:
during the first mode:
decoupling a data communication link between the second chip operating in the second power domain and a third chip operating in the first power domain; and
during the second mode:
coupling the data communication link between the second chip operating in the first power domain and the third chip in the first power domain.

18. The method of claim 14, further comprising:
during the first mode:
adjusting a voltage of data on a data communication link between the second chip operating in the second power domain and a third chip operating in the first power domain; and
during the second mode:
forgoing adjusting the voltage of the data on the data communication link between the second chip operating in the first power domain and the third chip in the first power domain.

19. A non-transitory computer-readable storage medium storing instructions, which when executed by one or more processors of an electronic device, cause the one or more processors to perform a method, the method comprising:
operating a first chip of the electronic device in a first power domain referenced to a first voltage, the first chip configured to generate a second voltage different than the first voltage and to generate one or more output voltages, the one or more output voltages referenced to the second voltage in a first mode and referenced to the first voltage in a second mode;

during the first mode:

operating a second chip of the electronic device, different than the first chip, in a second power domain, different from the first power domain, referenced to the second voltage and using the one or more output voltages referenced to the second voltage, wherein the second chip is configured to perform touch operations for a touch screen; and during the second mode:

operating the second chip in the first power domain referenced to the first voltage and using the one or more output voltages referenced to the first voltage, wherein the second chip is configured to perform display operations for the touch screen.

20. The non-transitory computer-readable medium of claim 19, wherein:

during the first mode:

the second chip is further configured to maintain display of an image displayed on the touch screen with reference to the second voltage.

21. The non-transitory computer-readable medium of claim 19, wherein:

during the first mode:

the second chip is further configured to perform display operations for the touch screen with reference to the second voltage.

22. The non-transitory computer-readable medium of claim 19, wherein the method further comprises:

during the first mode:

decoupling a data communication link between the second chip operating in the second power domain and a third chip of the electronic device operating in the first power domain; and during the second mode:

coupling the data communication link between the second chip operating in the first power domain and the third chip in the first power domain.

23. The non-transitory computer-readable medium of claim 19, wherein the method further comprises:

during the first mode:

adjusting a voltage of data on a data communication link between the second chip operating in the second power domain and a third chip operating in the first power domain; and during the second mode:

forgoing adjusting the voltage of the data on the data communication link between the second chip operating in the first power domain and the third chip in the first power domain.

* * * * *